United States Patent
Allen et al.

(10) Patent No.: US 11,391,901 B2
(45) Date of Patent: Jul. 19, 2022

(54) MODULAR OPTICAL FIBER SPLICE TRAY SYSTEM

(71) Applicant: Corning Research & Development Corporation, Corning, NY (US)

(72) Inventors: William George Allen, Austin, TX (US); Jeffrey Lane Shields, Austin, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/094,401

(22) Filed: Nov. 10, 2020

(65) Prior Publication Data

US 2021/0055496 A1 Feb. 25, 2021

Related U.S. Application Data

(63) Continuation of application No. PCT/US2019/029580, filed on Apr. 29, 2019.

(60) Provisional application No. 62/677,754, filed on May 30, 2018.

(51) Int. Cl.
*G02B 6/44* (2006.01)
*G02B 6/255* (2006.01)
*G02B 6/46* (2006.01)

(52) U.S. Cl.
CPC ......... *G02B 6/4454* (2013.01); *G02B 6/2551* (2013.01); *G02B 6/4446* (2013.01); *G02B 6/4471* (2013.01); *G02B 6/46* (2013.01)

(58) Field of Classification Search
CPC .................................................. G02B 6/4453
See application file for complete search history.

(56) References Cited

U.S. PATENT DOCUMENTS

| 4,958,903 | A | * | 9/1990 | Cobb | G02B 6/444 385/135 |
| 5,519,804 | A | | 5/1996 | Burek et al. | |
| 6,353,697 | B1 | | 3/2002 | Daoud | |
| 6,410,850 | B1 | * | 6/2002 | Abel | H02G 3/32 220/241 |
| 8,913,868 | B2 | * | 12/2014 | Hangebrauck | G02B 6/4454 385/137 |
| 2003/0123834 | A1 | | 7/2003 | Burek et al. | |
| 2004/0042755 | A1 | * | 3/2004 | Vincent | G02B 6/4454 385/135 |

(Continued)

FOREIGN PATENT DOCUMENTS

WO  WO-03093888 A1 * 11/2003 ........... G02B 6/3817
WO  2017/129815 A1  8/2017

OTHER PUBLICATIONS

International Search Report and Written Opinion of the International Searching Authority; PCT/US2019/029580; dated Jul. 11, 2019; 10 Pages; European Patent Office.

*Primary Examiner* — Charlie Y Peng
(74) *Attorney, Agent, or Firm* — Tamika A. Crawl-Bey

(57) ABSTRACT

The present description relates to a modular, reconfigurable splice tray system that comprises a splice tray having a base extending longitudinally from a first end to a second end, a pair of side walls extending longitudinally between the first and second ends of the base, a plurality of cable entrances formed at the first and second end of the base and a receiving portion configured to receive a modular component disposed between the cable entrances at the first end and at the second end.

19 Claims, 25 Drawing Sheets

(56) References Cited

U.S. PATENT DOCUMENTS

2007/0047891 A1   3/2007  Bayazit et al.

* cited by examiner

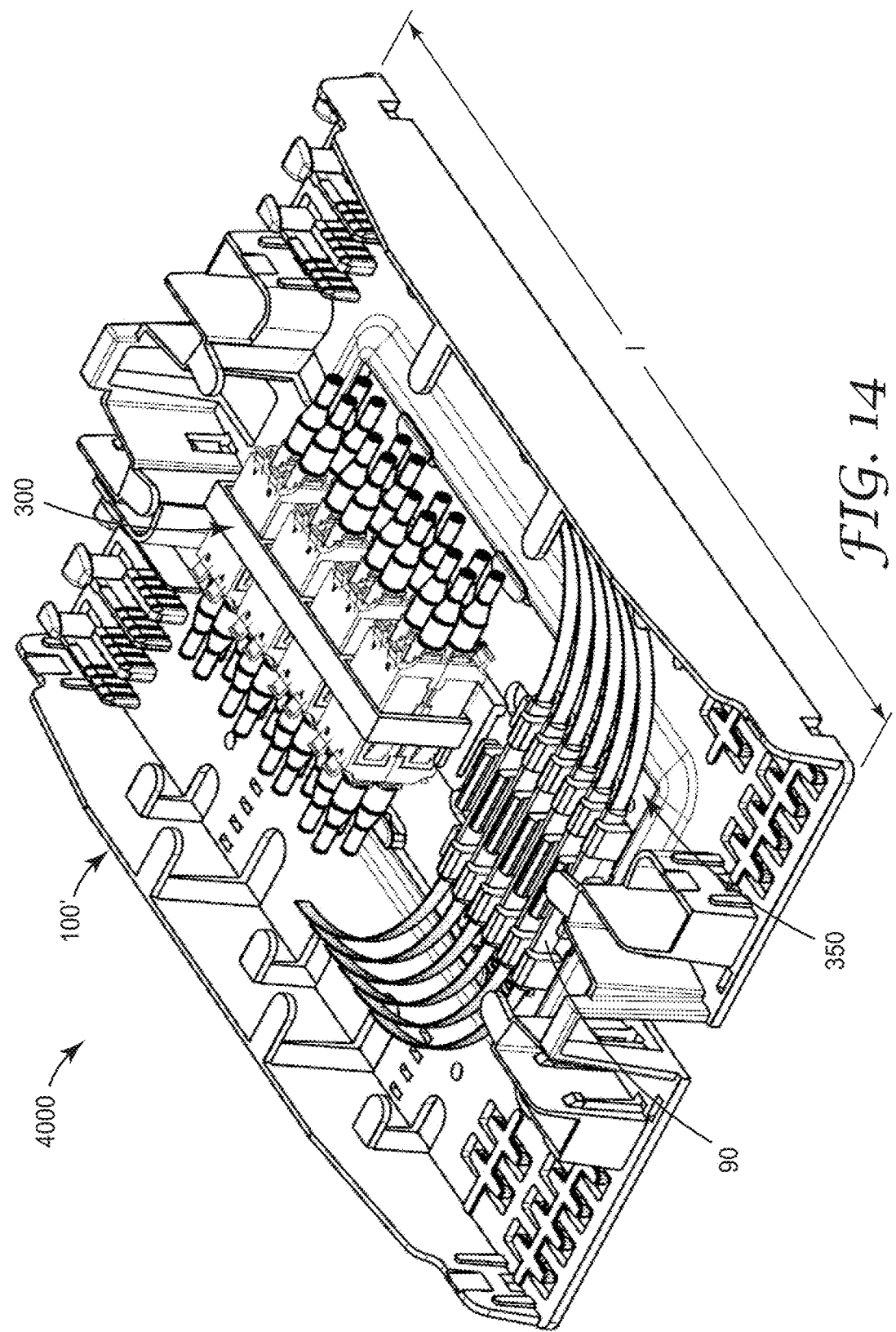

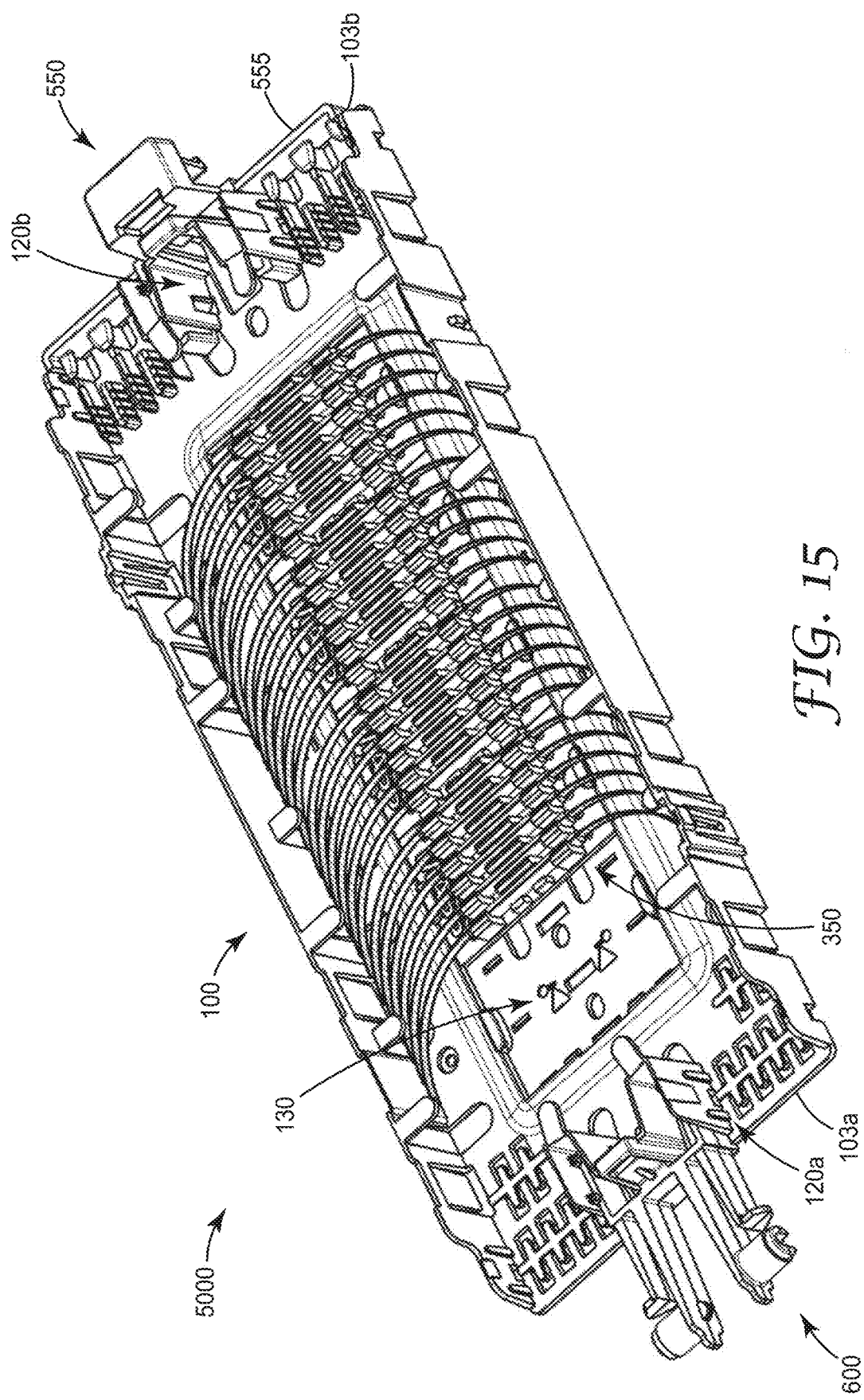

MODULAR OPTICAL FIBER SPLICE TRAY SYSTEM

CROSS REFERENCE TO RELATED APPLICATIONS

This application is a continuation of International Application No. PCT/US2019/029580, filed Apr. 29, 2019, and claims the benefit of priority to U.S. Provisional Application No. 62/677,754, filed May 30, 2018. Each aforementioned application is relied upon and incorporated herein by reference in its entirety.

FIELD

The present description relates to a modular, reconfigurable splice tray system for use in either inline or butt-style enclosures. In particular, a splice tray of the exemplary modular, reconfigurable splice tray system can be combined with a wide range of modular components to change not only the configuration of the splice tray, but the application space where the splice tray can be used.

BACKGROUND

Telecommunication cables are used for distributing data across vast networks. Modern communication and data networks rely on fiber optic transmission lines or cables due to their high speed and low attenuation characteristics. As these fiber optic cables are routed across networks, it is necessary to periodically open the cable and splice or tap into the cable so that data may be distributed to "branches" of the network. The branches may be further distributed until the network reaches individual homes, businesses, offices, and so on. The distributed lines are often referred to as drop lines. At each fiber access point where the cable is opened, it is necessary to provide some type of enclosure to protect the cable (and potentially unjacketed fiber) and allow easy and repeated access to the cable. These enclosures need to provide features to store the fiber optic lines as well as allow for the interconnection between the incoming and outgoing fiber optic lines.

The purpose and configuration of the enclosure will vary depending on where the enclosure is located in a network. When an enclosure is used to interconnect distribution lines, the number of splices that can be made in the enclosure is a factor in determining which enclosure and which accessories within the enclosure are used. Frequently, telecommunication carriers want to use the smallest enclosure that can accommodate the needed number of splices due to factors like the cost of the enclosure, cost of installation, as well as aesthetics for above grade installations. At another point in the network, an enclosure can be used to distribute signals from a few optical fibers to many optical fibers through the use of optical splitters. While in another application, an enclosure may also contain a termination field for interconnecting optical fiber connectors.

As networks expand telecommunication carriers may want to add a cable to an existing fiber access point to increase capacity of a portion of the network or bring service to an area which did not have high speed, gigabit service previously. In order to do this the optical fiber interconnection capacity of enclosures at these fiber access points needs to increase.

Trays are a primary component used within communication enclosures to house optical fiber interconnection components such as optical fiber splices, optical splitters and the like. The shape and utility of a splice tray can differ depending on if the splice tray will be used in an inline or butt-style enclosure. Additionally, splice trays are typically sized for a particular size of enclosure. Both of these factors can lead to inventory issues in trying to manage the wide range of components needed to expand a fiber optic communication network.

Telecommunication service providers are asking for simpler more versatile enclosure systems.

SUMMARY

The present description relates to a modular, reconfigurable splice tray system. In a first embodiment, the modular, reconfigurable splice tray system comprises a splice tray having a base extending longitudinally from a first end to a second end, a pair of side walls extending longitudinally between the first and second ends of the base, and a plurality of cable entrances formed at the first and second end of the base, wherein the base tray connection features that are configured to connect two splice trays together in a side-by-side configuration.

In a second embodiment, a modular, reconfigurable splice tray system comprises a splice tray having a base extending longitudinally from a first end to a second end, a pair of side walls extending longitudinally between the first and second ends of the base, a plurality of cable entrances formed at the first and second end of the base and a receiving portion configured to receive a modular component disposed between the cable entrances at the first end and at the second end.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 14 is a forth exemplary configuration of the modular, reconfigurable splice tray system of the present invention.

FIG. 15 is a fifth exemplary configuration of the modular, reconfigurable splice tray system of the present invention.

Figure 1:
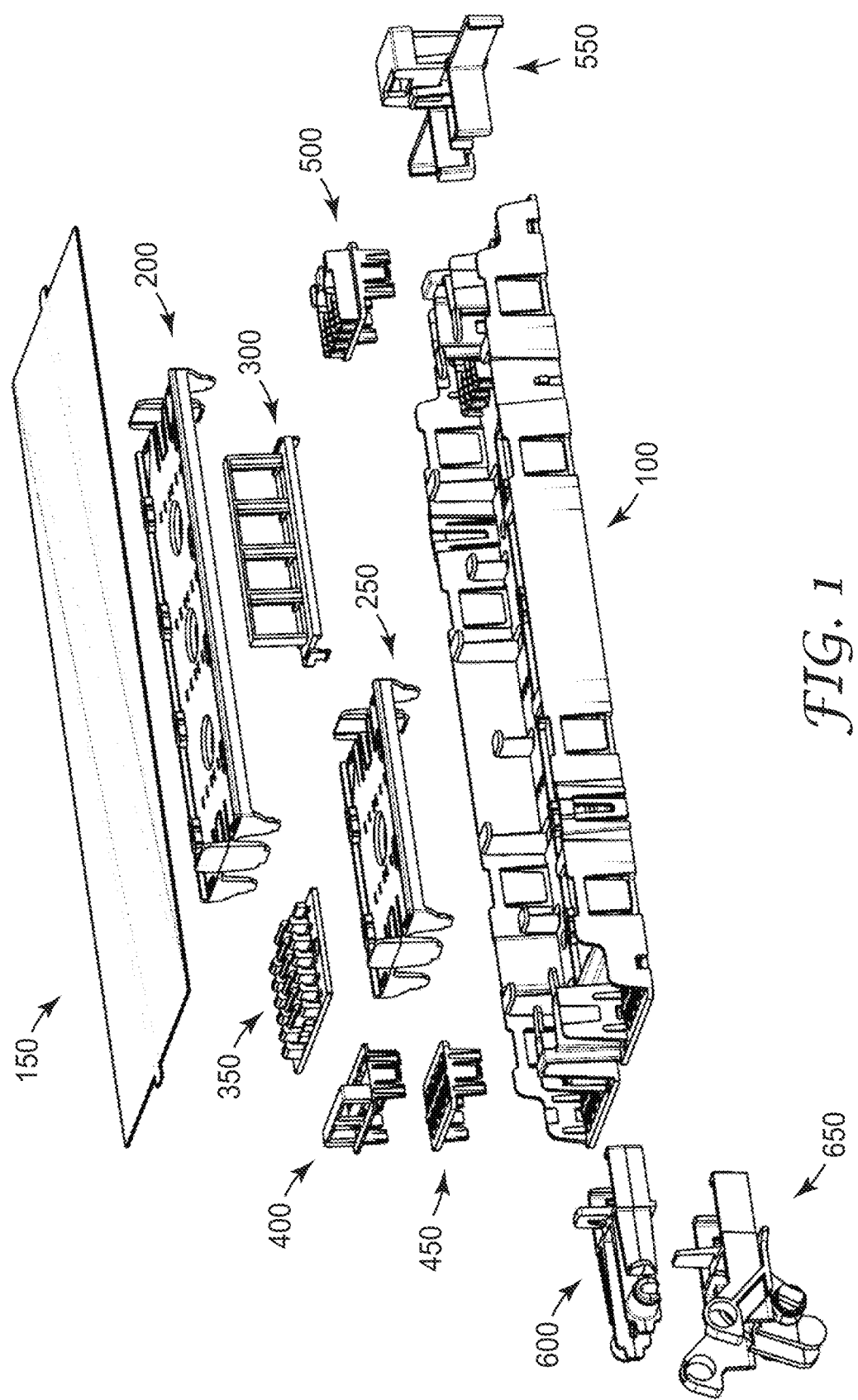
FIG. 1 is an exploded view of a modular, reconfigurable splice tray system of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

Various exemplary embodiments of the disclosure will now be described with particular reference to the drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "coupled with" or "in contact with" another element, component or layer, it can be directly on, directly coupled with, in direct contact with, or intervening elements, components or layers may be on, connected, coupled or in contact with the particular element, component or layer, for example. When an element, component or layer for example is referred to as being "directly on," "directly coupled with," or "directly in contact with" another element, there are no intervening elements, components or layers for example.

The modular, reconfigurable splice tray system described herein is a highly configurable splice tray system that can be used to interconnect optical fibers. The optical fibers can be in the form of individual 250 μm coated optical fibers, 900 μm buffer coated optical fibers, small diameter jacketed cables, optical fibers contained in buffer tubes, or optical ribbon fibers. For example, the modular, reconfigurable splice tray system can be used with ribbon fiber cables, such as the RocketRibbon™ Extreme Density Cable available from Corning, Inc. Corning, N.Y.).

The modular, reconfigurable splice tray system can be used for splicing ribbon and discrete fiber containing stackable cable entry devices. The style of the cable entry region of a splice tray can be changed by utilizing snap-in cable entry components. In some embodiments the snap-in cable entry components allow multi-level fiber entry attach points. While in other embodiments, the snap-in cable entry components can be used to mount fiber optic connector adaptors enabling optical fiber connector connections in the cable entry region of the splice tray.

The spice tray of the exemplary system has interconnection features which permit attaching two or more of the splice trays in a side by side arrangement creating a larger tray having multiple compartments. The wall between adjacent compartments include removable partitions for fibers to pass between compartments. Tray expansion features are self-mating and require no additional parts.

The modular, reconfigurable splice tray system includes additional snap-in modular components to increase the trays splice density using a removable splice insert riser. In another aspect, the removable splice insert riser can removed from the splice tray during the splicing and reinstalled in the tray afterwards. In some applications, the space under the insert riser can be used to manage and store the ribbon fiber.

Other snap in modular components enable the conversion of a flat stacked splice tray to pivoting splice tray. Common structural design of the modular components allows parts to be mixed and matched for use across a line of splice trays.

Figure 21A:
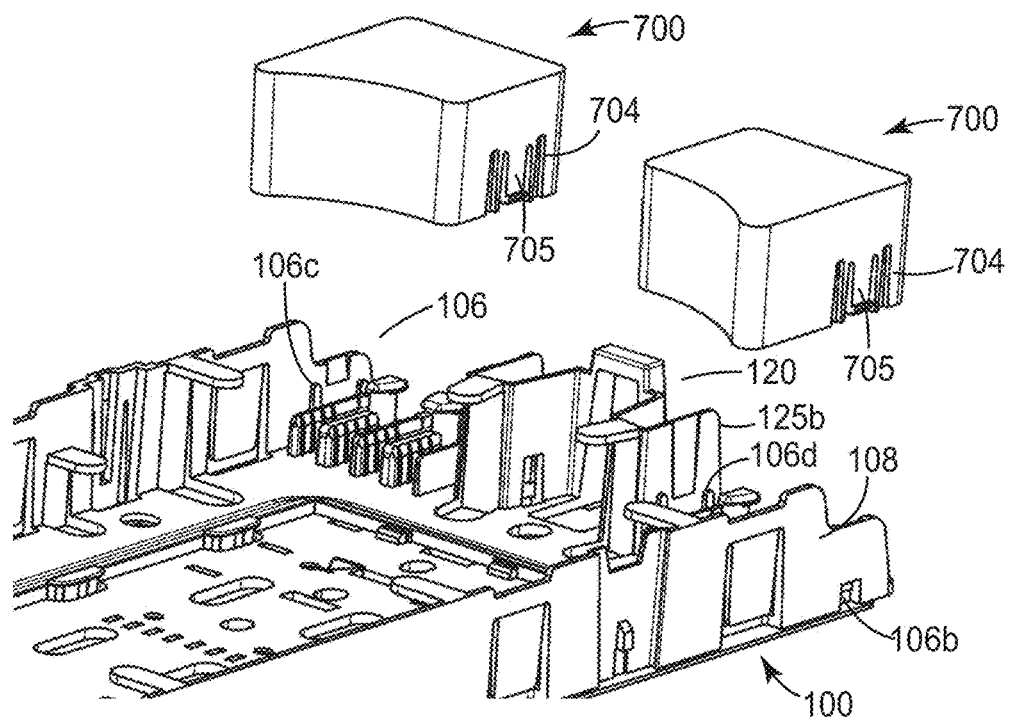
FIGS. 21A and 21B are two views of fiber guide components that close off an end of a conventional splice tray making the splice tray suitable for use in a butt-style enclosure.
Figure 21B:
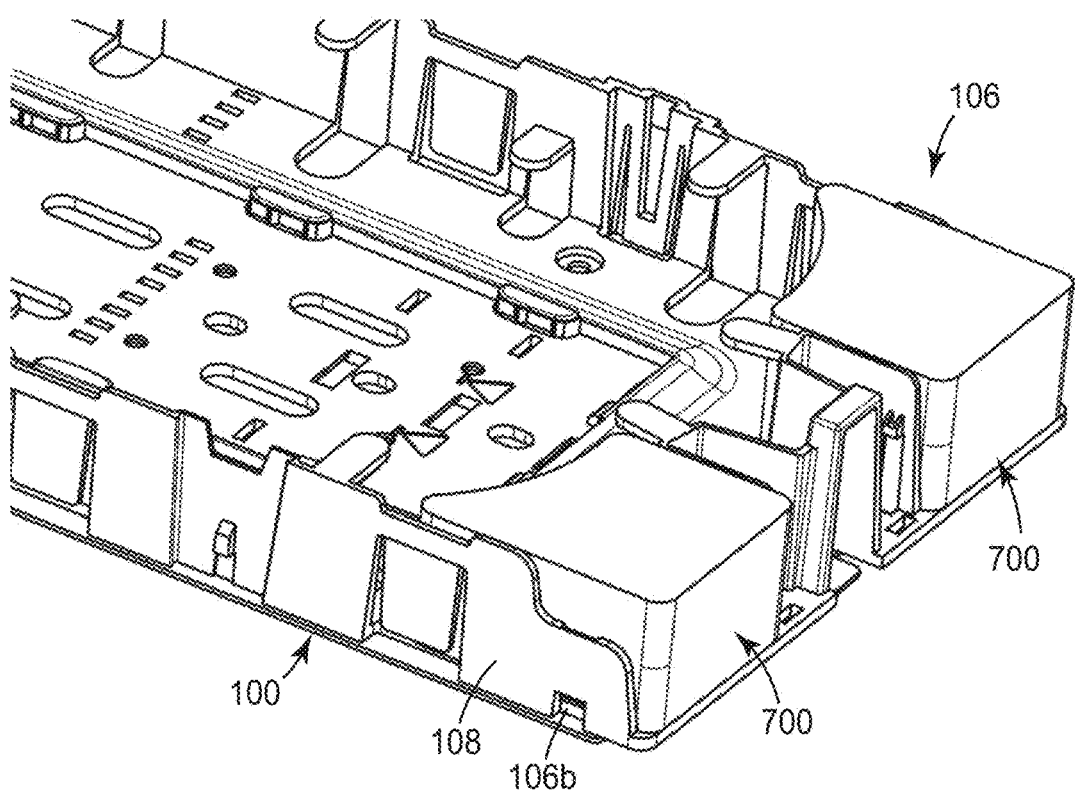

FIG. 1 shows a selection of the modular components that can be assembled onto an exemplary splice tray 100 in the modular, reconfigurable splice tray system. The exemplary components can be mixed and matched and attached to splice tray 100 in a large number of different configurations. The modular components can include a tray cover 150; optical component risers 200, 250; optical connector adapter holder 300; optical component holders 350; snap-in cable entry components 400, 450, 500; a latch component 550; snap-on hinge components 600, 650; and fiber guide components 700 (FIG. 21A-21B).

Figure 2A:
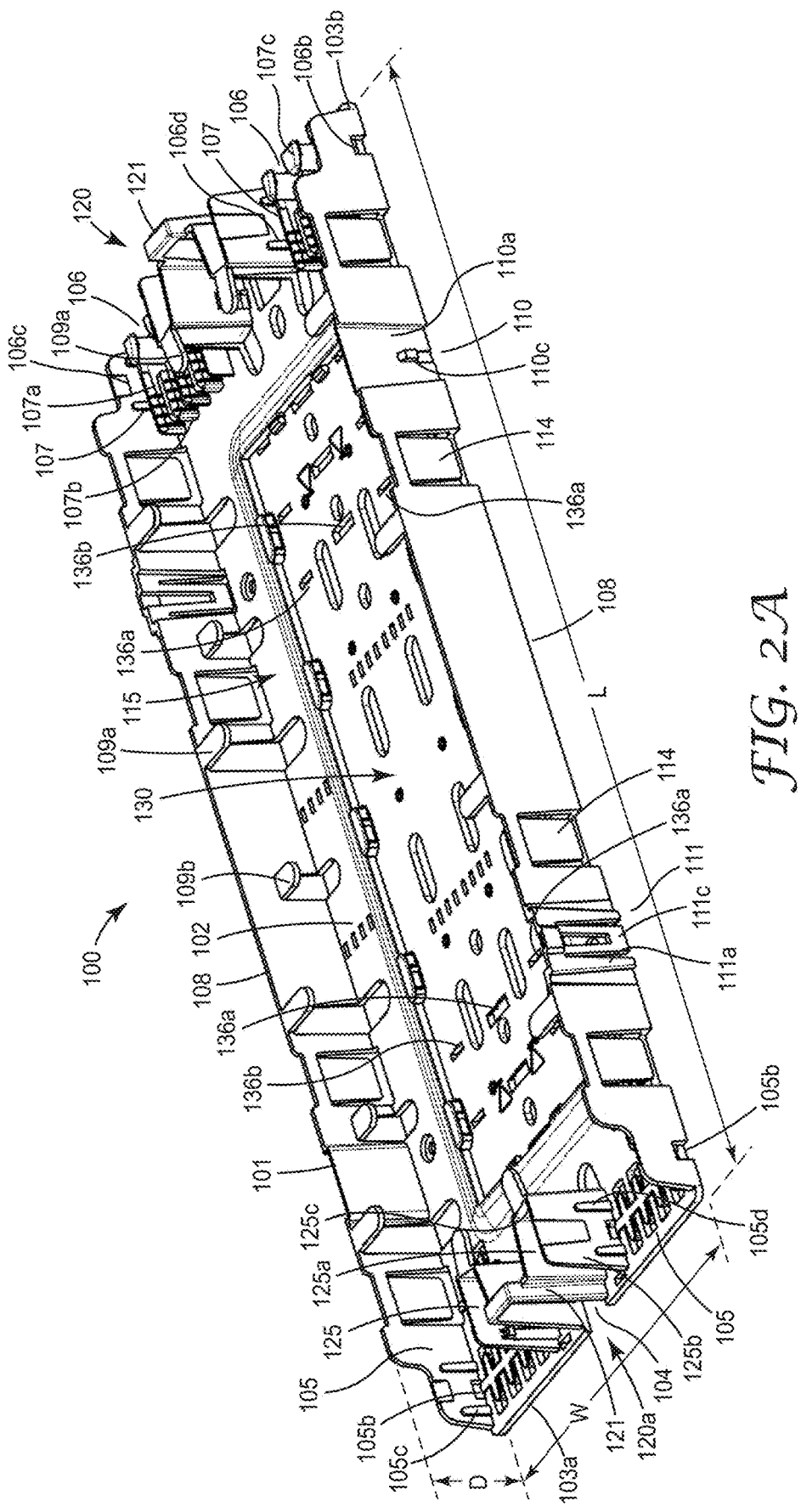
FIGS. 2A and 2B are two views of a splice tray of the modular, reconfigurable splice tray system of FIG. 1

FIG. 2A shows an exemplary splice tray 100 for use in the modular, reconfigurable splice tray system. Splice tray 100 has a rectangular shape and can be characterized by its dimensions: Length, L; Width, W; and Depth, D. The depth of the tray can be between 12 mm and 25 mm so that the splice tray has sufficient vertical clearance to allow crossing over of optical fiber ribbons or buffer tubes. In an exemplary aspect, the length of the tray can be between 200 mm and 350 mm and the width of the tray can be about 75 mm to about 150 mm. In an alternative aspect the exemplary splice tray may have other dimensions depending on the enclosure in which they are to be placed.

Splice tray 100 has tray body 101 comprising a base 102 extending longitudinally from a first end 103a to a second end 103b, wherein the base includes first cable entrances 105 at the first end of the splice tray and second cable entrances 106 at the second end of the splice tray. Side walls 108 extend along the longitudinal edges of the base between cable entrance 105, 106 on either side of the tray. The splice tray includes an interconnection area 130 along its longitudinal central axis and a fiber routing area 115 around the interior circumference of the splice tray. In an exemplary aspect, the interconnection area on the splice tray can have a shallow channel formed in the base that is configured to accept a plurality of optical component holders 350 (FIG. 1).

A first receiving portion 120a is disposed at the first end 103a of the splice tray 100 between the first cable entrances 105 and a second receiving portion 120b is disposed at the second end 103b of the splice tray between the second cable entrances 106. In the embodiment shown in FIG. 2A, the first and second receiving portions 120a, 120b are structurally similar and will be referred to as receiving portion 120. The receiving portions facilitate the attachment of several of the modular components to the splice tray. In particular, receiving portions facilitate the attachment of tray cover 150, a latch component 550, and snap-on hinge components 600, 650, shown in FIG. 1. Additionally, the receiving portions also provide a feature to anchor one side of the snap-in cable entry components 400, 450, 500 when they are disposed in one or more of the cable entrances.

Figure 2B:
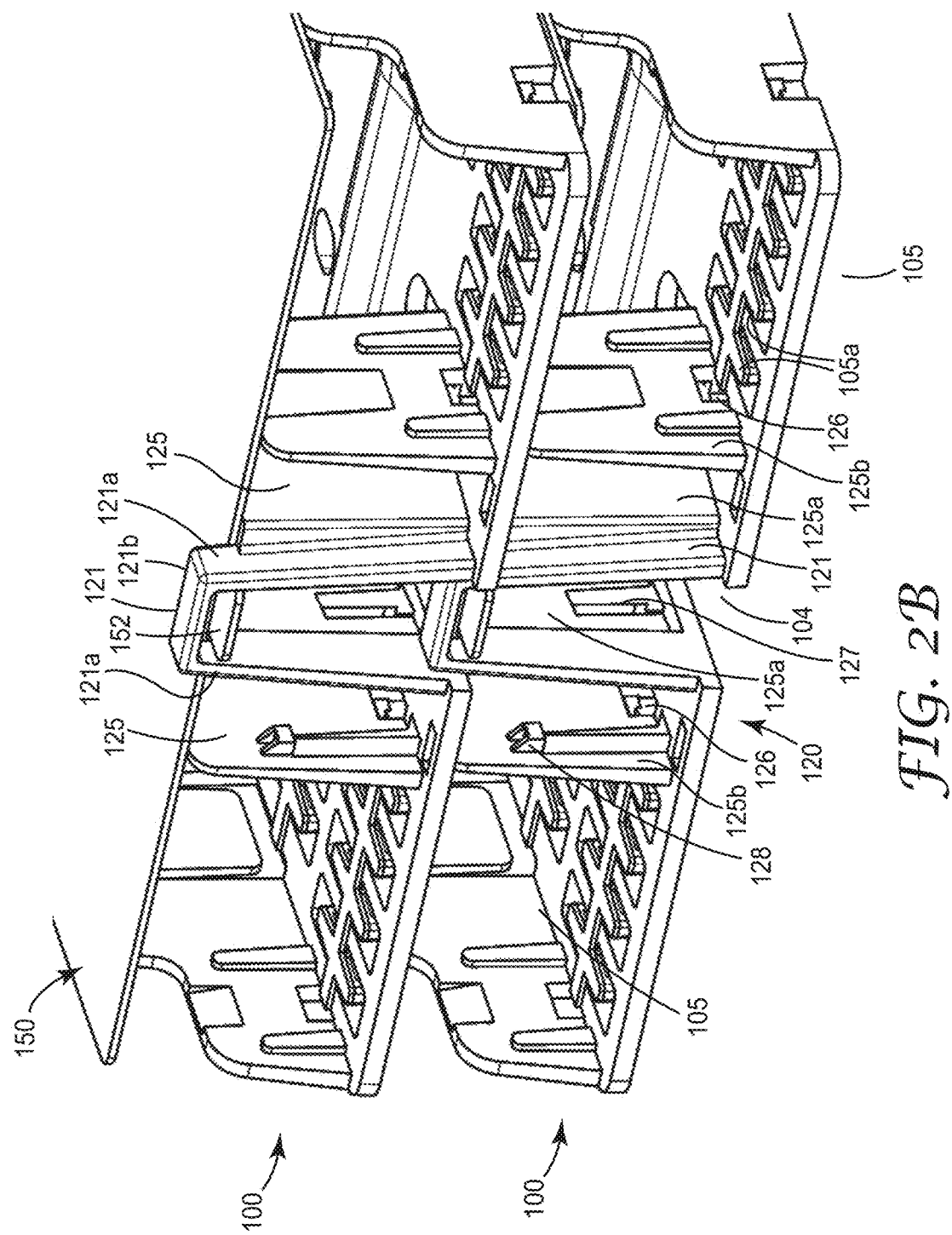
Figure 4:
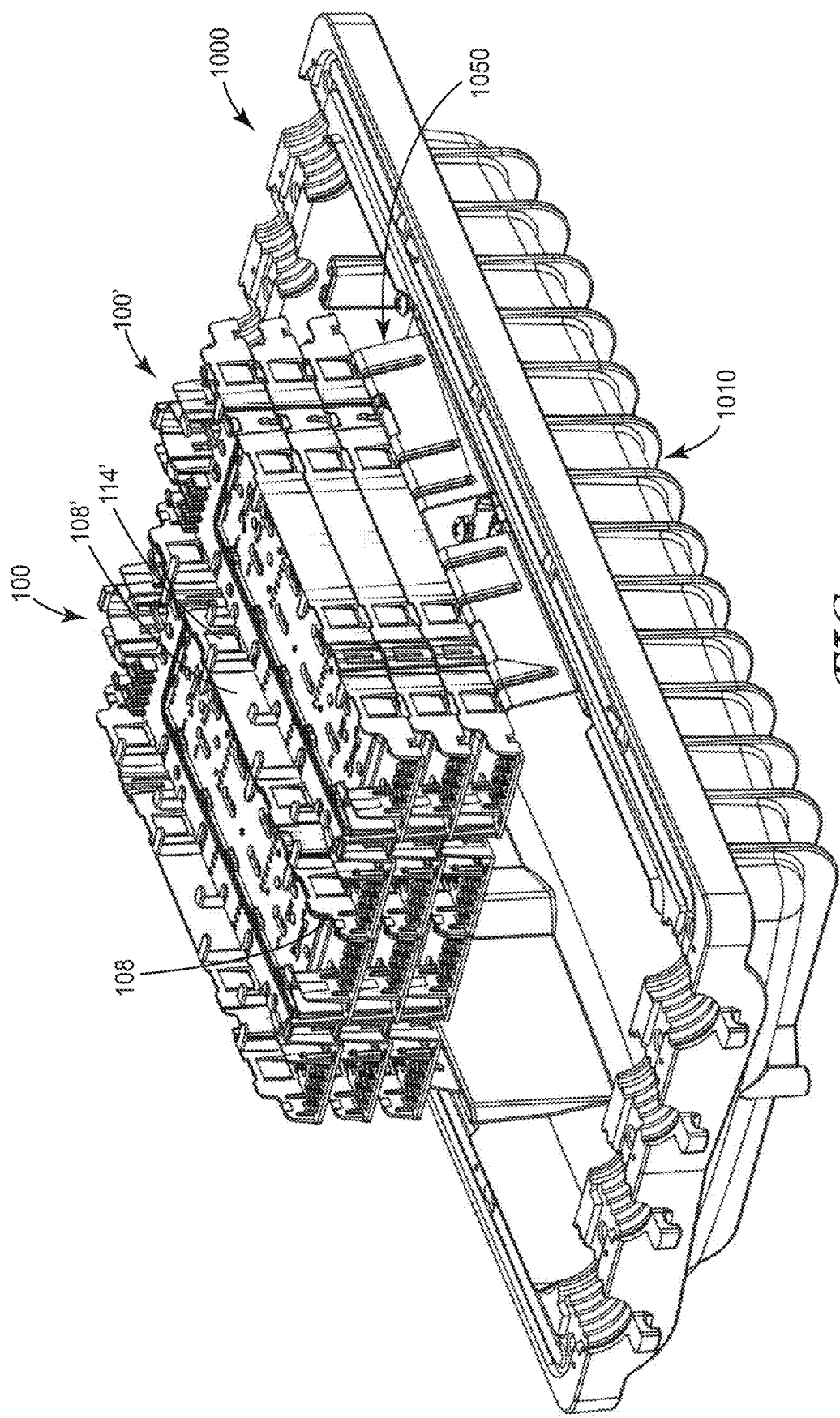
FIG. 4 is a first exemplary configuration of the modular, reconfigurable splice tray system of the present invention.

FIG. 2B is a detail view of a first end 103a of splice tray 100. Receiving portions 120 include a frame portion 121 centered between a pair of connection bays 125. Frame 121 can have an open trapezoidal shape and be positioned over an opening 104 in the base 102 of the splice tray. The frame portions 121 include two inclined columns 121a and a top beam 121b. In one aspect, the frame portions as the ends of the splice tray can be nested or partially inserted into the frame portion of another splice tray to align two or more splice trays when they are disposed in a vertical stack as shown in FIGS. 2B and 4. Connection bays 125 include side partitions 125a, 125b and an end partition 125c (FIG. 2A). The side partitions may be angled such that the entrance to the connection bays is wider than the end partition to facilitate connection of the modular components. Connection openings 126, 127 can be formed in the side partitions; the connection openings being configured to accept connection latches of the modular components, which will be described in more detail regarding the individual connection components below.

In some applications, frame portion 121 can accept a tab portion 152 of cover 150 between columns 121a and beneath top beam 121b to secure the cover over the open face of the splice tray.

In one aspect, splice tray 100 can include four cable entrances 105, 106 adjacent to the corners of the splice tray. Cable entrances 105 include a plurality of tie down points 105a to strain relieve cables, cable sub units or buffer tubes containing individual optical fibers or fiber ribbons entering and exiting the exemplary splice tray. The entering and exiting cables or buffer tubes can be secured to the tie downs by conventional cable ties. Cable entrances 106 include a plurality of gripping structures 107 to strain relieve cables, self-closing extruded fiber tube or zip tube, or buffer tubes containing individual optical fibers or fiber ribbons entering and exiting the exemplary splice tray. Each gripping structure comprises a pair of parallel wall sections 107a and a plurality of teeth or barbs 107b (shown in FIGS. 2A and 11) on the facing surfaces of the wall sections that will grip onto the surface of the cable, zip tube or buffer tube passing through the gripping devices. The pair of parallel wall sections comprise a long wall section and a short wall section. The long wall sections have a hold-down feature 107c formed at the top of an end of each long wall section that extend at least part way over a cable channel through the gripping device. The center long wall section has two hold-down features formed at the top of an end thereof extending at least part way over the cable channels on either side of the center long wall section. The hold-down features are configured to retain the cables, zip tubes or buffer tubes in the gripping structure.

While tray 100 is shown as having two different two different cable entrance structures at the first and second ends of the splice tray, one of ordinary skill in the art will recognize that all of the cable entrances in the tray can comprise all of cable entrance 105 or all of cable entrance 106, and thus is considered to be within the scope of the invention as it is described herein.

Side walls 108 and the end partitions 125c of the receiving portions 120 of splice tray 100 define the outer circumference of fiber routing area 115. The fiber routing area can be used to store excess lengths of optical fiber between the outer walls of the splice tray (i.e. side wall 108 and end partitions) as well as provide space for routing optical fibers to and from interconnection area 130. A plurality of tabs 109a can extend from the top edges of the side walls of the splice tray and the guide walls to help retain the optical fibers within the boundaries of the splice tray. Auxiliary tabs 109b can extend from side walls 108 into the fiber routing area to help manage a first fiber slack layer below the auxiliary taps and support a second slack fiber layer above the auxiliary tabs.

Figure 3A:
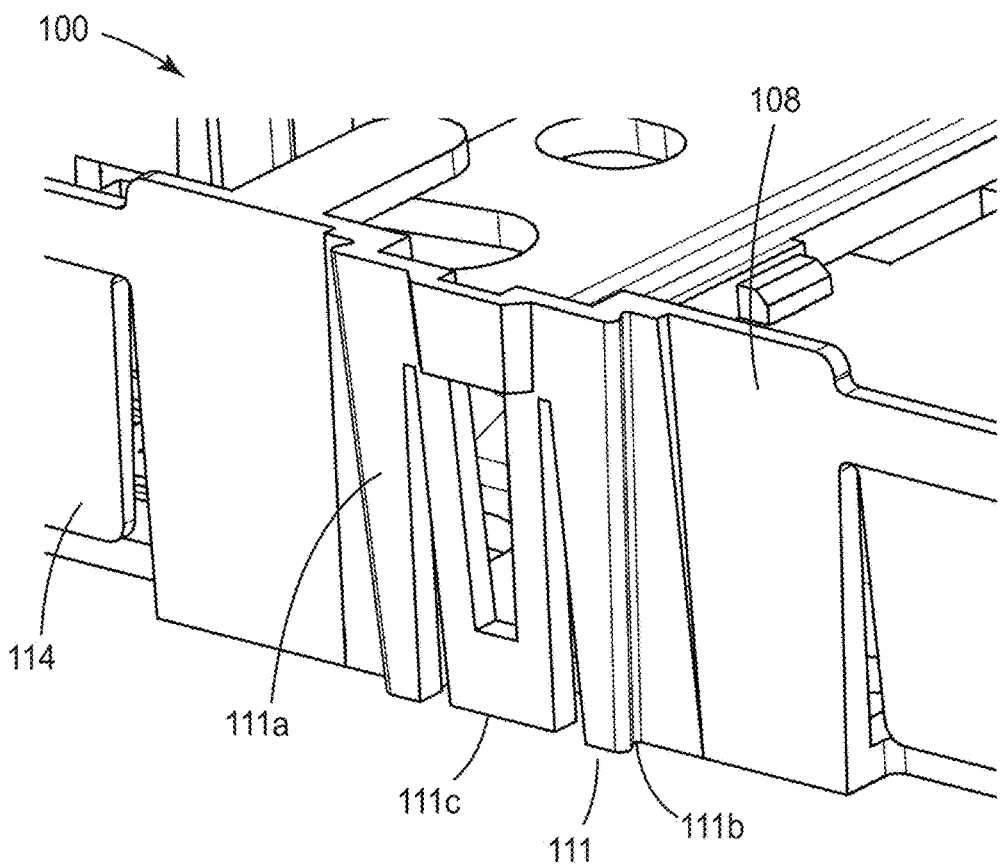
FIGS. 3A-3C are detail views of a feature of the splice tray of FIGS. 2A and 2B
Figure 3B:
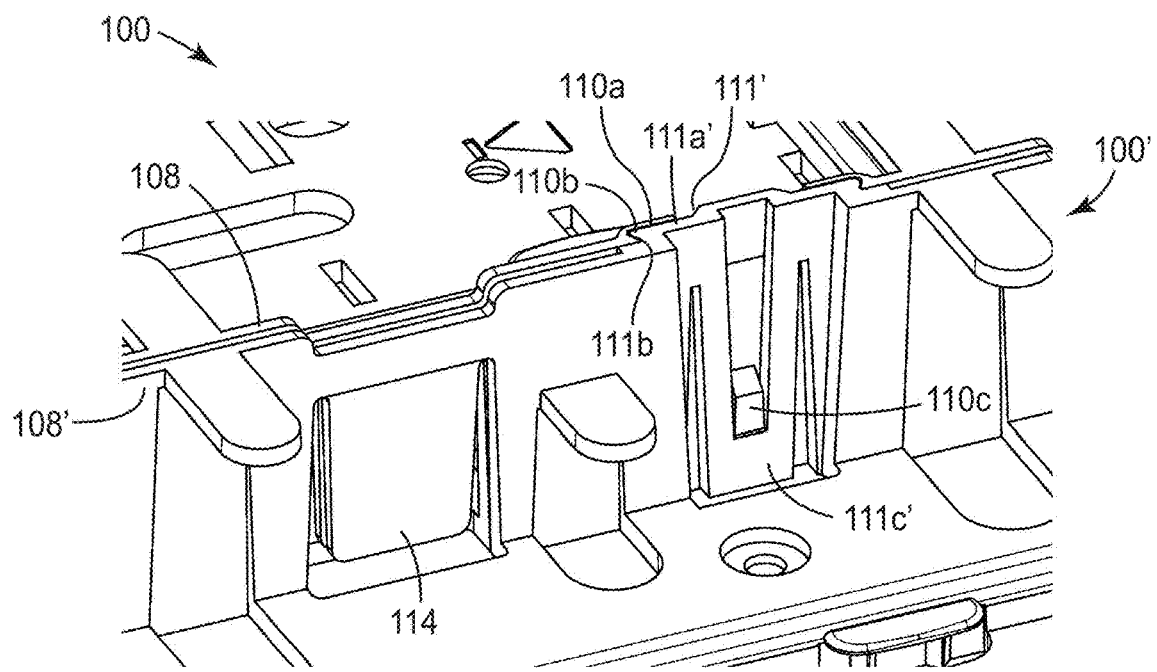

Referring to FIG. 2A and FIGS. 3A-3B, each side wall 108 can include tray connection features 110 and 111 to connect two splice trays together in a side by side configuration. Tray connection features 110 comprise a depression 110a formed in the exterior surface of sidewall 108 and a latching protrusion 110c extending from the bottom depression and configured to mate with latch 111c of connection feature 111' in a second splice tray 100' shown in FIGS. 3B and 3C. In an exemplary aspect, depression 110a can have a dove tail shape with an overhanging lip 110b (FIG. 3B) forming the female dovetail connection feature. FIG. 3A is a detail view of connection feature 111, which is in the form of the male dove tail feature that mates into the female dovetail connection feature 110. Connection feature 111 comprise a pair of vertical guide rails 111a and latch 111c. The guide rails are inclined to engage with the dovetail depression and have an undercut portion 111b that is configured to retain the overhanging lip 110b of connection feature 110.

Figure 3C:
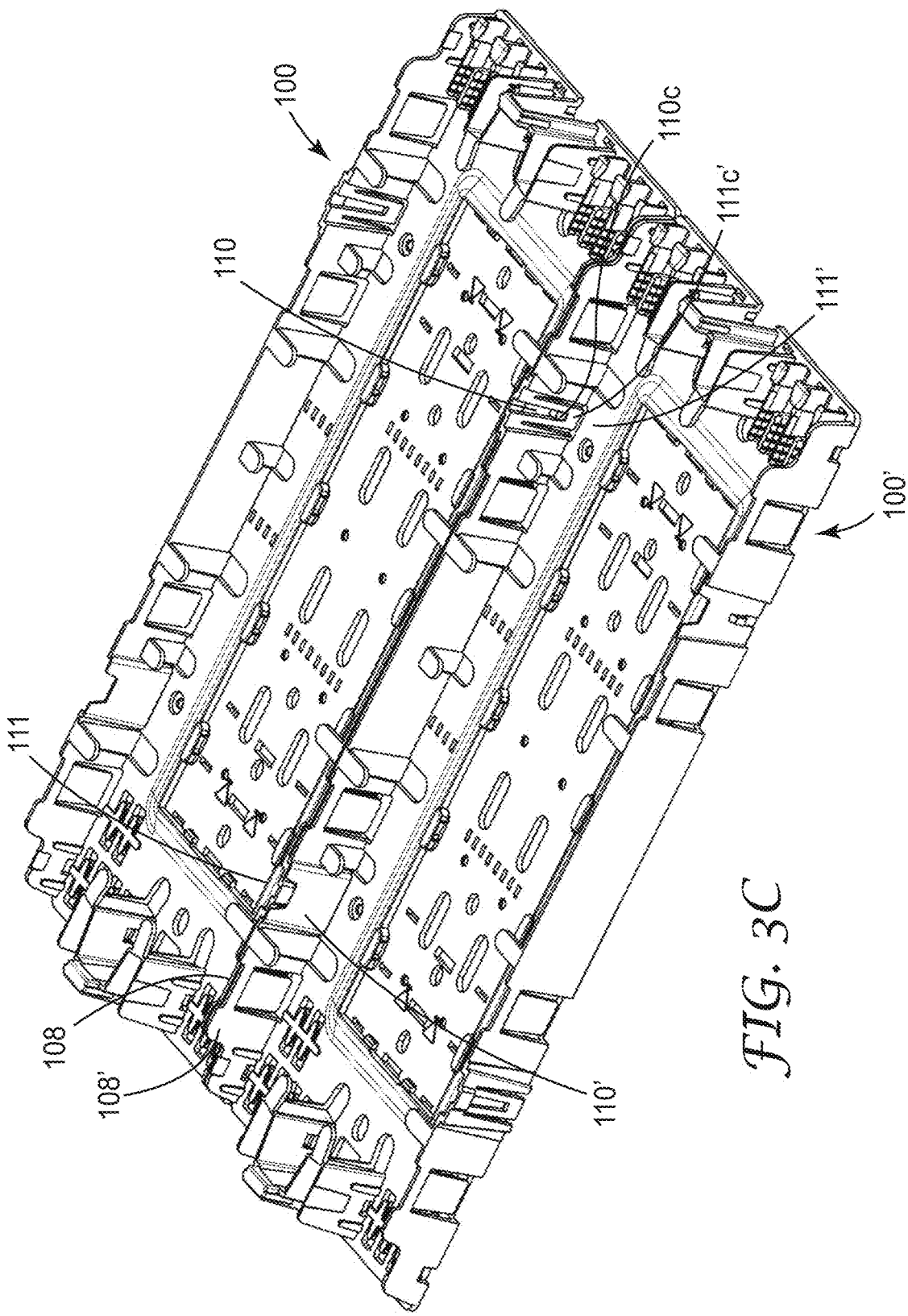

FIGS. 3B and 3C shows two splice trays 100, 100' connected together with via connection features 110, 111' on the side walls 108, 108' of the first and second splice trays, respectively, in FIG. 3B the engagement between the overhanging lip 110b of the first connection feature 110 with undercut portion 111b' of the second connection feature 111'.

FIG. 4 shows a stack of duplexed splice trays 100, 100' disposed on a splice tray platform 1050 attached to the base 1010 of an enclosure 1000. The side walls 108, 108' of the duplexed splice trays include removeable portions 114, 114' (FIGS. 3A-3C and 4) that when removed provide pass throughs to facilitate routing of optical fibers and or ribbons between the duplexed splice trays.

Figure 5A:
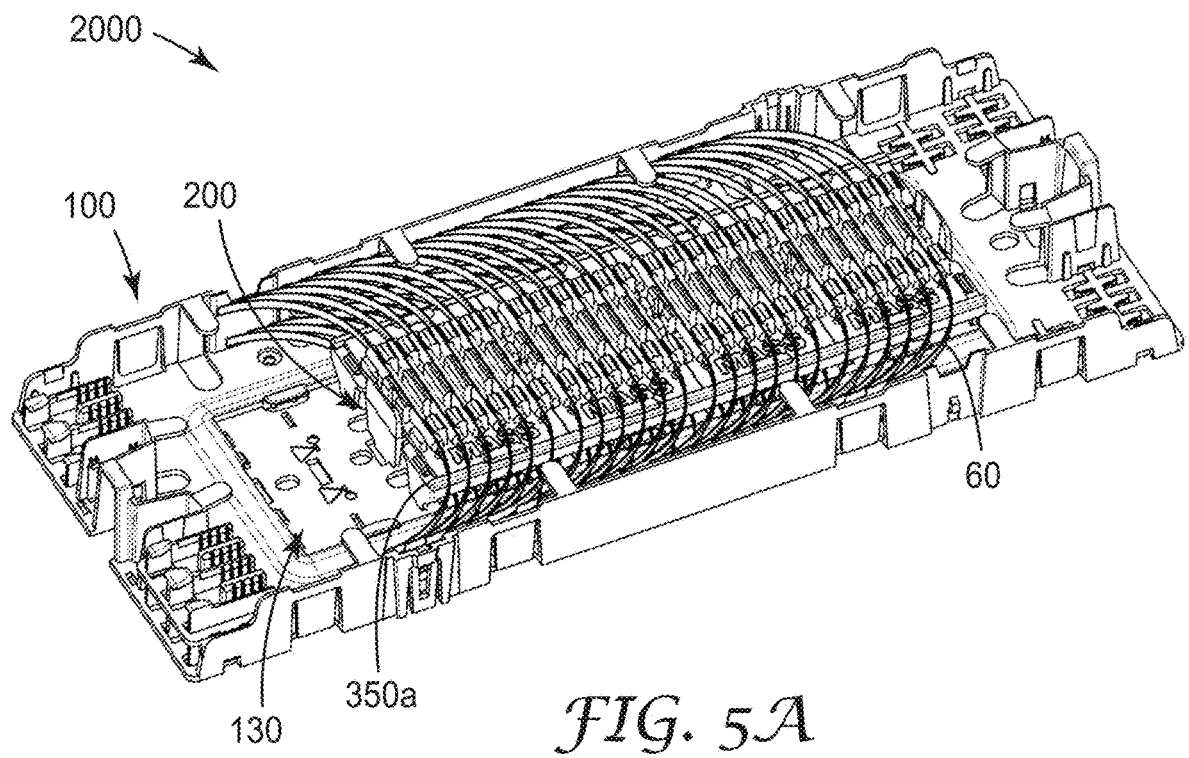
FIGS. 5A and 5B are a second exemplary configuration of the modular, reconfigurable splice tray system of the present invention.
Figure 5B:
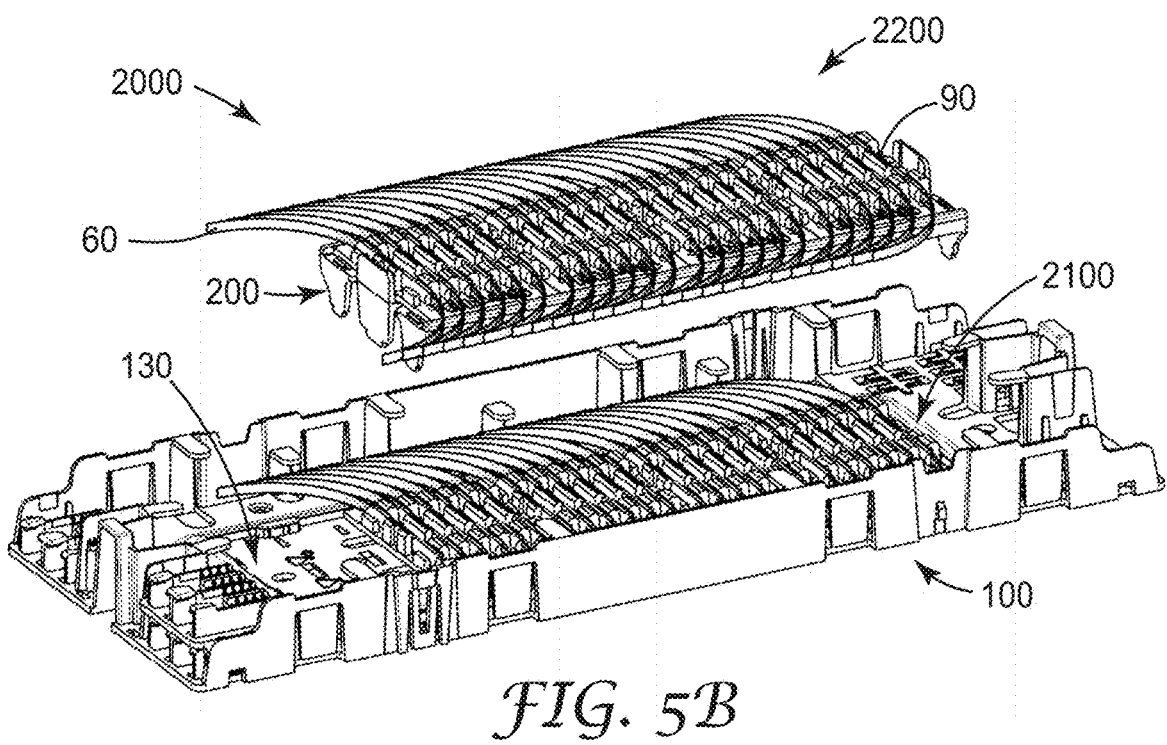
Figure 6:
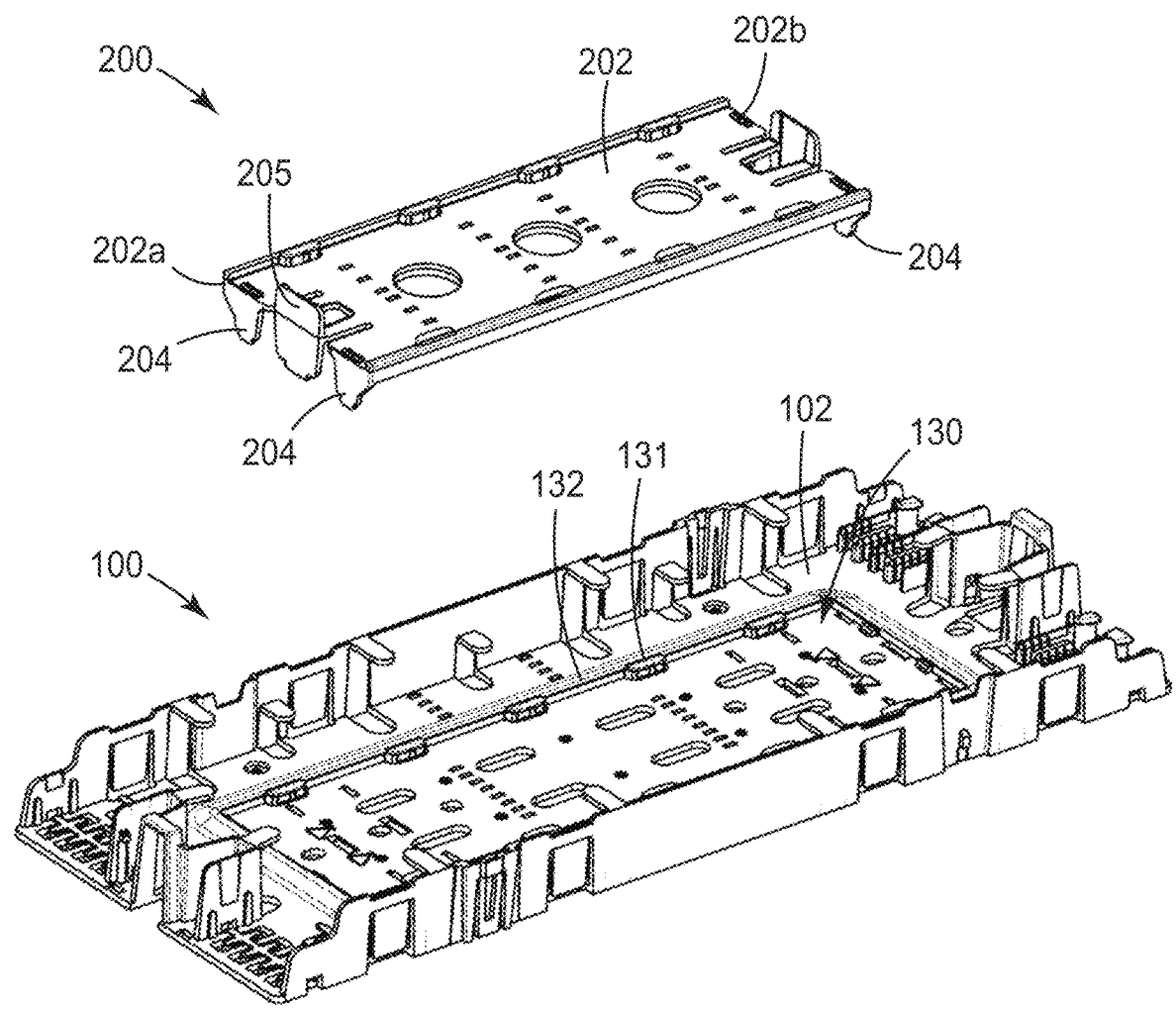
FIG. 6 is an isometric view of the modular components used in FIGS. 5A and 5B.

FIGS. 5A-5B and 6 show one configuration of the modular, reconfigurable splice tray system in the form of a high density ribbon fiber splice tray. Ribbon fiber splice devices 90 are arranged in optical component holders, in particular mass fusion splice holders 350A in two layers. The first layer is disposed in interconnection area 130 and the second layer is disposed on a detachable optical component riser 200.

FIGS. 5A-5B and 6 show one configuration of the modular, reconfigurable splice tray system in the form of a high density ribbon fiber splice tray 2000. Ribbon fiber splice devices are arranged in optical component holders, in particular mass fusion splice holders 350A in two interconnection layers 2100 and 2200. The first interconnection layer 2100 is disposed in interconnection area 130 and the second interconnection layer 2200 is disposed on a detachable optical component riser 200.

Interconnection area 130 can accommodate a variety of optical components. Optical components may include optical fiber splices (e.g. mechanical splices, fusion splices, mass fusion splices or mass mechanical splices), optical splitters and optical connector adapters. The splices can be disposed in conventional optical component holders 350; the optical splitter can be disposed in an optical splitter holder and the optical fiber adapter can be held in a modular connector adapter holder 300 (Shown for example in FIGS. 1, 13 and 14). In an exemplary aspect, the interconnection area can include a first interconnection layer disposed on a base of the splice tray, and a second interconnection layer positioned over at least a portion of the first interconnection layer.

Up to five optical component holders can be disposed in Interconnection area 130 of splice tray 100. In the embodiments shown in FIGS. 5A-5B, the interconnection area holds four optical component holders 350A. Optical component holders of the first interconnection layer 2100 can be secured to the base 102 of splice tray 100 by an adhesive, such as a piece of double sided tape or a transfer adhesive, or by engaging with first insert catches 131 disposed along the edges of interconnection area 130. Similarly, optical component holders 350*a* of the second interconnection layer 2200 can be either adhesively or mechanically secured to the detachable optical component riser 200. Utilizing the detachable optical component riser allows for splice inserts to be stacked, essentially doubling the interconnection density (e.g. splice count) of the splice tray.

Exemplary optical component holders are used to secure/ organize and/or identify the optical components stored therein. Conventional optical component holders may be made of a foam, an elastomer, a rubber or a plastic material which can be secured in splice tray by either an adhesive or by mechanical means. In one aspect, Optical component holders can be configured to hold individual mechanical splices such as 3M™ Fibrlok™ II Universal Optical Fiber Splice 2529 or 3M™ Fibrlok™ 250 µm Fiber Splice 2540 available from 3M company (St. Paul, Minn.), or individual fusion splices (2.4 mm fusion splices or 3 mm fusion splices) such as 3M™ Fiber Optic Splice Sleeve (3 mm sleeves) or 3M™ BPEO Fiber Optic Splice Sleeve (2.4 mm sleeves) also available from 3M company. In another aspect, Optical component holders can be configured to hold mass fusion splices or mass mechanical splices. Conventional optical component holders that are configured to hold fusion splices include 2.4 mm Single Fusion Splice Insert, 3.0 mm Single Fusion Splice Insert, 12RF Mass Fusion Splice Insert, each of which is available from 3M Company.

FIG. 6 shows the splice tray 100 and detachable optical component riser 200 used in the high-density splice tray 2000 of FIGS. 5A and 5B without the optical fiber ribbons 60, ribbon fiber splice devices 90 and optical component holders 350A. Splice tray 100, is the same splice tray as previously described in reference to FIG. 2A.

Detachable optical component riser 200 can be a tablelike structure comprising a generally rectangular surface panel 202 having a first end 202*a* and a second end 202*b* and four legs 204 extending from the support panel. Two legs extend from an edge of the support panel at the first end and two more of the legs extend from the edge of the support panel at its second end. A latch arm 205 is disposed between the legs at each end of the support panel to attach the optical component riser to splice tray 100. The bottom edge of the latch arm 205 may include a barb (not shown) to improve the retention force of the optical component riser.

Splice tray 100 can include a plurality of sets of three slots 136*a*, 136*b* formed in a row in the width direction in interconnection area 130. In each row of slots, there are two slots 136*a* near each edge 132 of the interconnection area that are configured to receive the base of each leg 204 and a center slot 136*b* that is configured to mate with the end of the latch arm 205 so secure the optical component riser to the splice tray. Having a plurality of sets of these slots enables the optical component riser to be placed at various points along the length of the splice tray or may permit the use of different sizes of optical component risers to be used in a single tray. For example, optical component riser 200 can hold four optical component holders while optical component riser 250 (FIGS. 1 and 7) are configured to hold two optical component holders.

Figure 7:
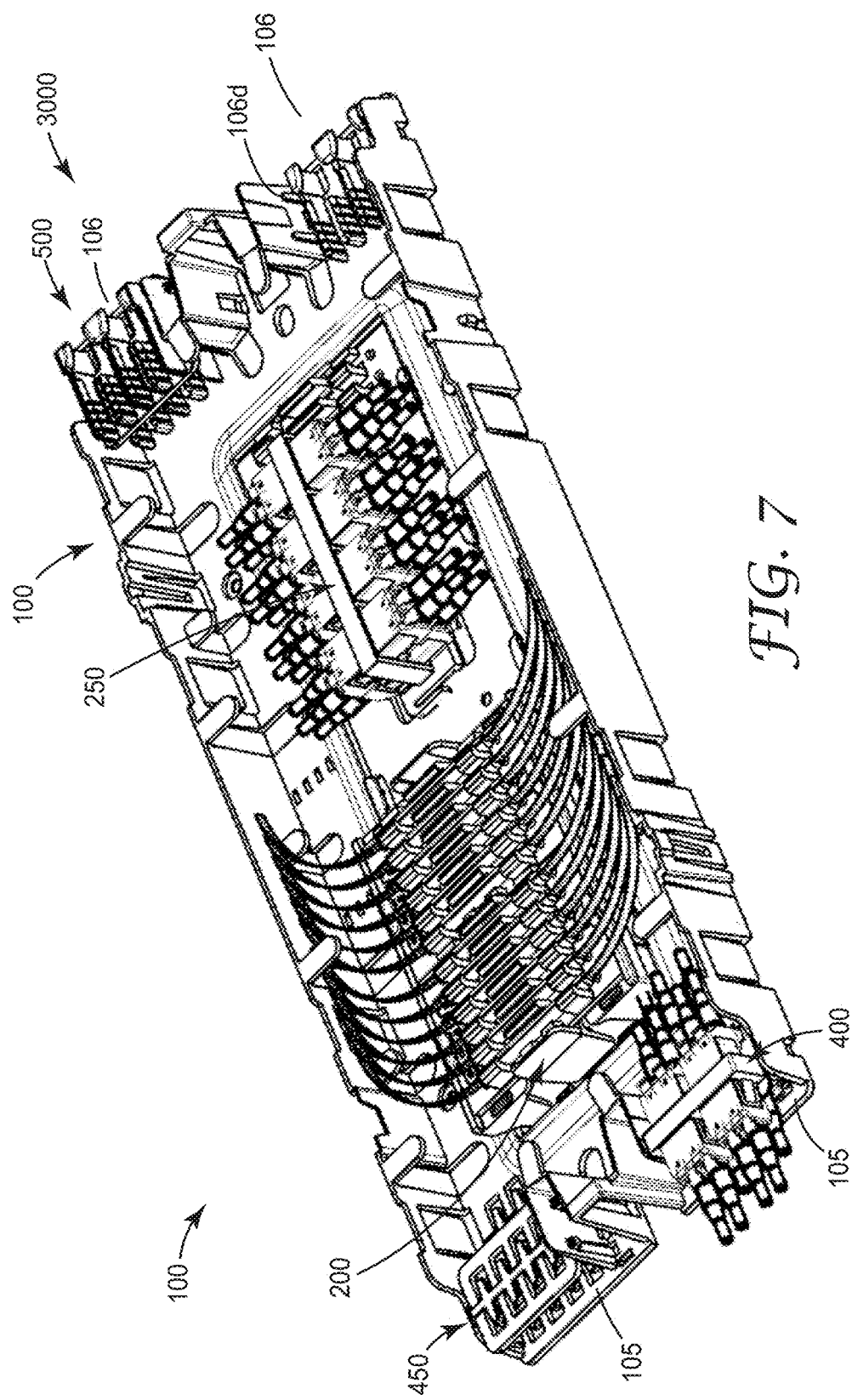
FIG. 7 is a third exemplary configuration of the modular, reconfigurable splice tray system of the present invention.
Figure 8A:
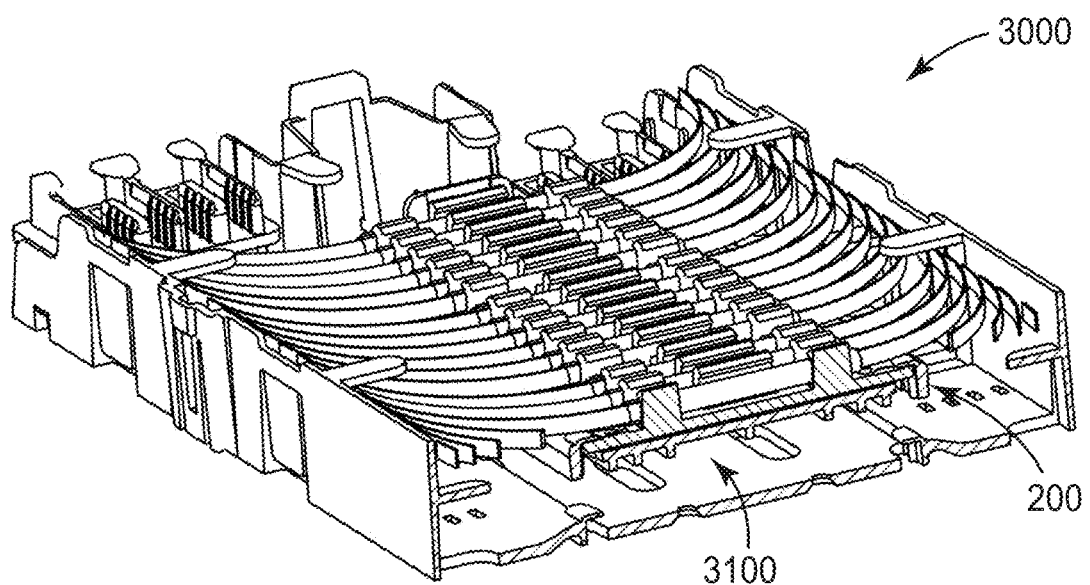
FIGS. 8A and 8B are detail views of the third exemplary configuration of the modular, reconfigurable splice tray system of FIG. 7.
Figure 8B:
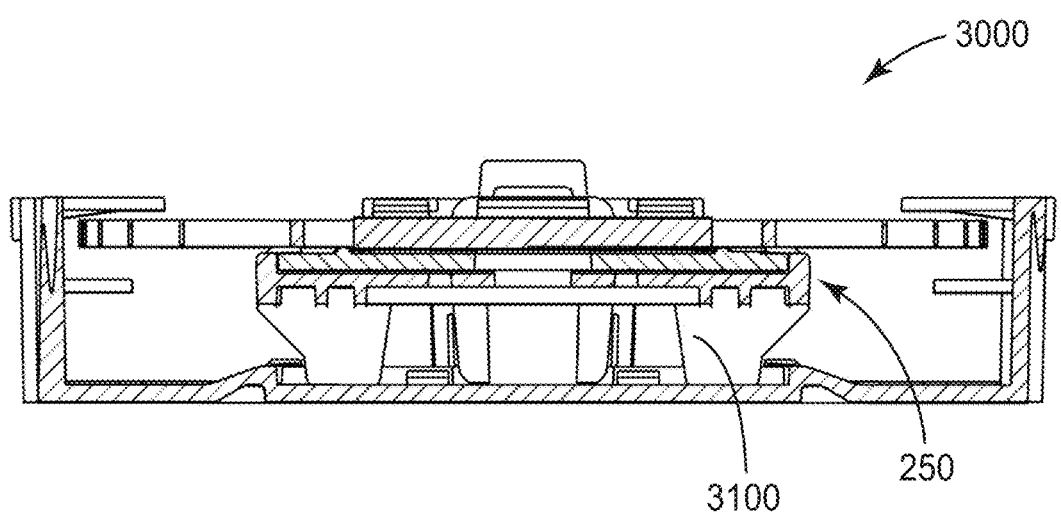

FIGS. 7 and 8A-8B show one configuration of the modular, reconfigurable splice tray system having increase slack storage and optical fiber connector connectivity in splice tray 3000. Rather than having a first interconnection layer as described previously with respect to FIGS. 5A-5B, the area beneath optical component riser 250 can provide additional slack storage capacity in space 3100. Optical component riser 250 is structurally similar to optical component riser 200 described previously.

Splice tray 3000 further includes a number of snap-in cable entry components 400, 450, 500 installed in cable entrances 105, 106. While splice tray 3000 includes one each of snap-in cable entry components 400, 450, 500, the snap-in cable entry components can be mixed and matched depending on the needs of a particular application in the optical network. Additionally, any number of snap-in cable entry components may be used up to the number cable entrances in the splice tray.

A first embodiment of a snap-in cable entry components comprises an optical connector connection platform 400. Detail views of optical connector connection platform 400 are provided in FIGS. 12A and 12B. Optical connector connection platform 400 has a flat top plate 402 having a first side 400*a*, a second side 400*b* and two opposing edges 400*c*, 400*d* extending between the first and second sides of the top plate. A first adapter bulkhead 410*a* extends from the top surface 401 of flat plate 402 near edge 400*c* and between the first and second sides of the top plate. A second adapter bulkhead 410*b* extends from the bottom surface of flat plate 402 near edge 400*d* and between the first and second sides of the top plate. The first and second bulkheads are structurally similar and will be referred to collectively as adapter bulkhead 410.

Adapter bulkhead 410 comprises a generally rectangular open frame 411 having an adapter mounting plate 412 integrally formed on and covering a portion of one of the vertical faces of the open frame. The adapter mounting plate has at least one opening 413 to accept and hold a connector adapter 70. The connector adapters can be selected from simplex connector adapters (e.g. MPO connector adapters, SC connector adapters, etc.) or duplex connector adapters such as the LC connector adapters 70 shown in FIG. 12B. The connector adapters are held in openings by positioning the adapter mounting plate 412 between the flange 57 and the spring clips 76 of the connector adapters.

Figure 12A:
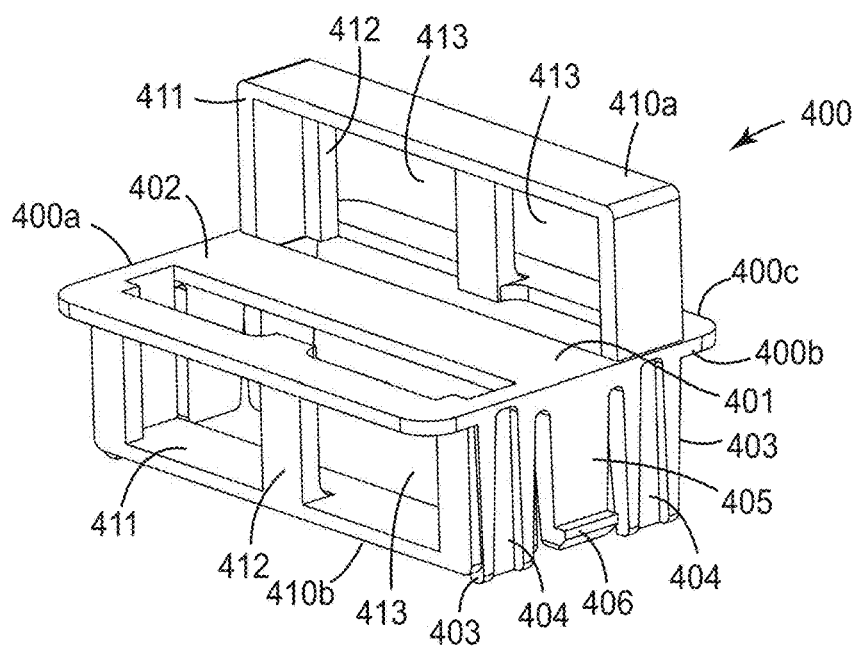
FIGS. 12A and 12B shows a third cable entry component used in FIG. 7.
Figure 12B:
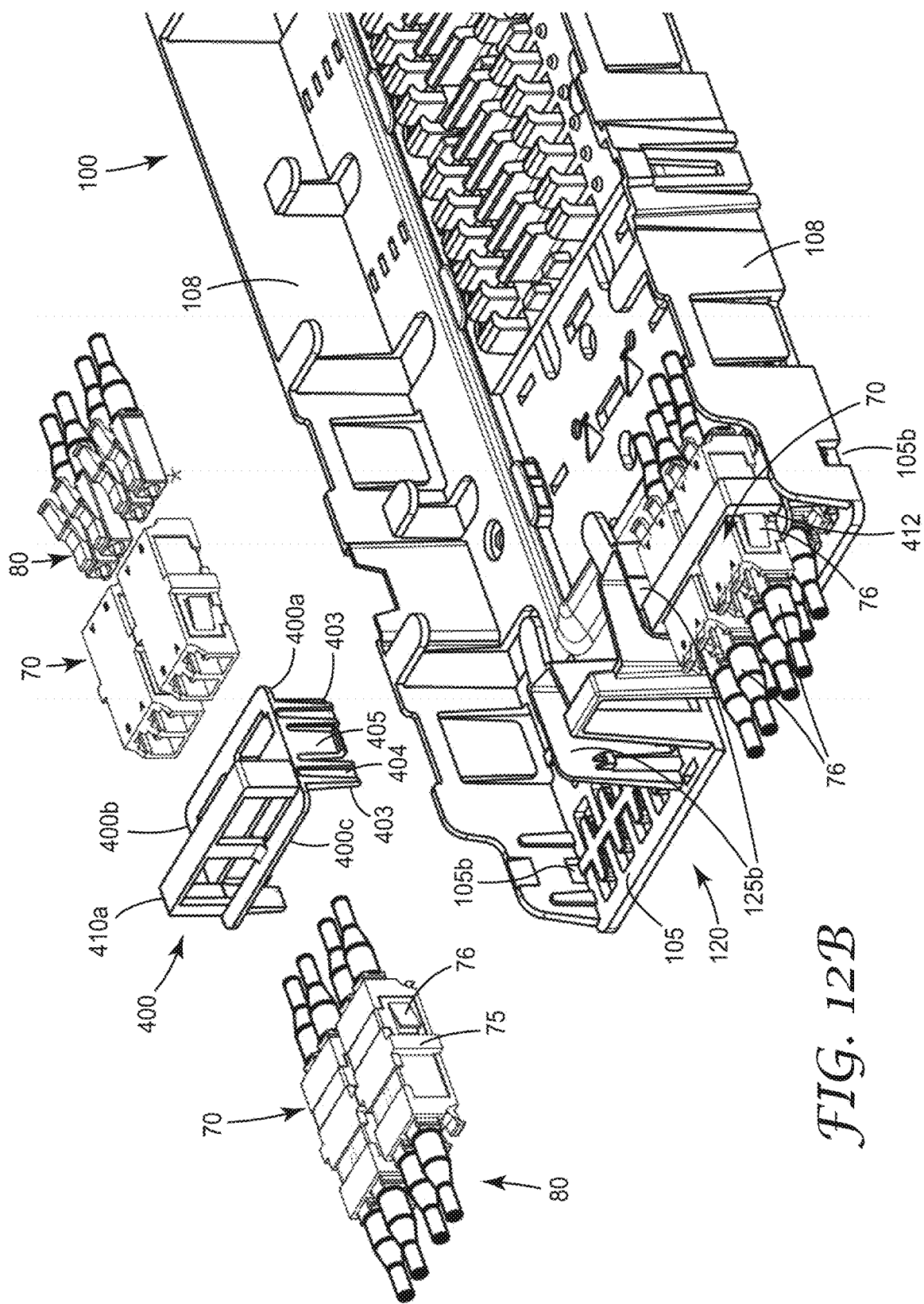

In the exemplary embodiment shown in FIGS. 12A-12B, each of the first and second adapter bulkheads 410a, 410b is configured to hold two connector adapters 70 providing a connection location for eight pairs of optical fiber connectors 80, since the connector adapters shown in the figure are duplex connector adapters.

Optical connector connection platform 400 further includes four legs 403 extending from flat top plate 402 on a first side 400a and a second side 400b and near the corners of the top plate. A latch arm 405 extends from the flat top plate on each side between legs 403. The latch arm has an outward facing barb 406 that is configured to lock into connection openings or slots 105b in side walls 108 of splice tray 100 and slot 126 (FIG. 2B) in side partition 125b of receiving portion 120. In an exemplary aspect, cable entrance 105 can include vertical guides 105c disposed on the inside surface of sidewall 108 and 105d formed on partition 125b shown in FIGS. 2A and 2B. The vertical guides fit into grooves 404 formed in the legs 403 of the optical connector connection platform to align and stabilize the optical connector connection platform in the cable entrance providing fiber optic connector connectivity in the cable entrance 105 of splice tray 100.

In an alternative embodiment, optical connector connection platform can include only a single adapter bulkhead extending from either the top or bottom surface of the optical connector connection platform's top plate.

Figure 9A:
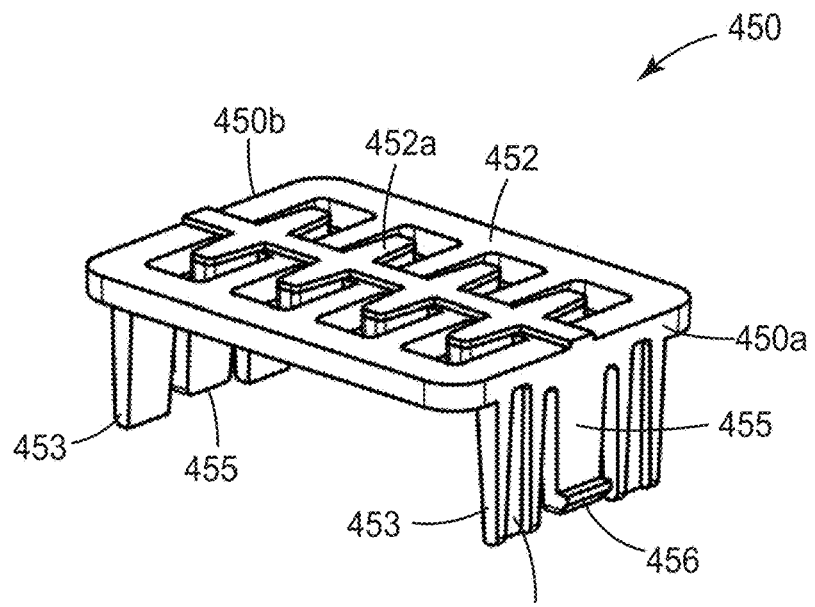
FIGS. 9A and 9B are two views of a first cable entry component used in FIG. 7.
Figure 9B:
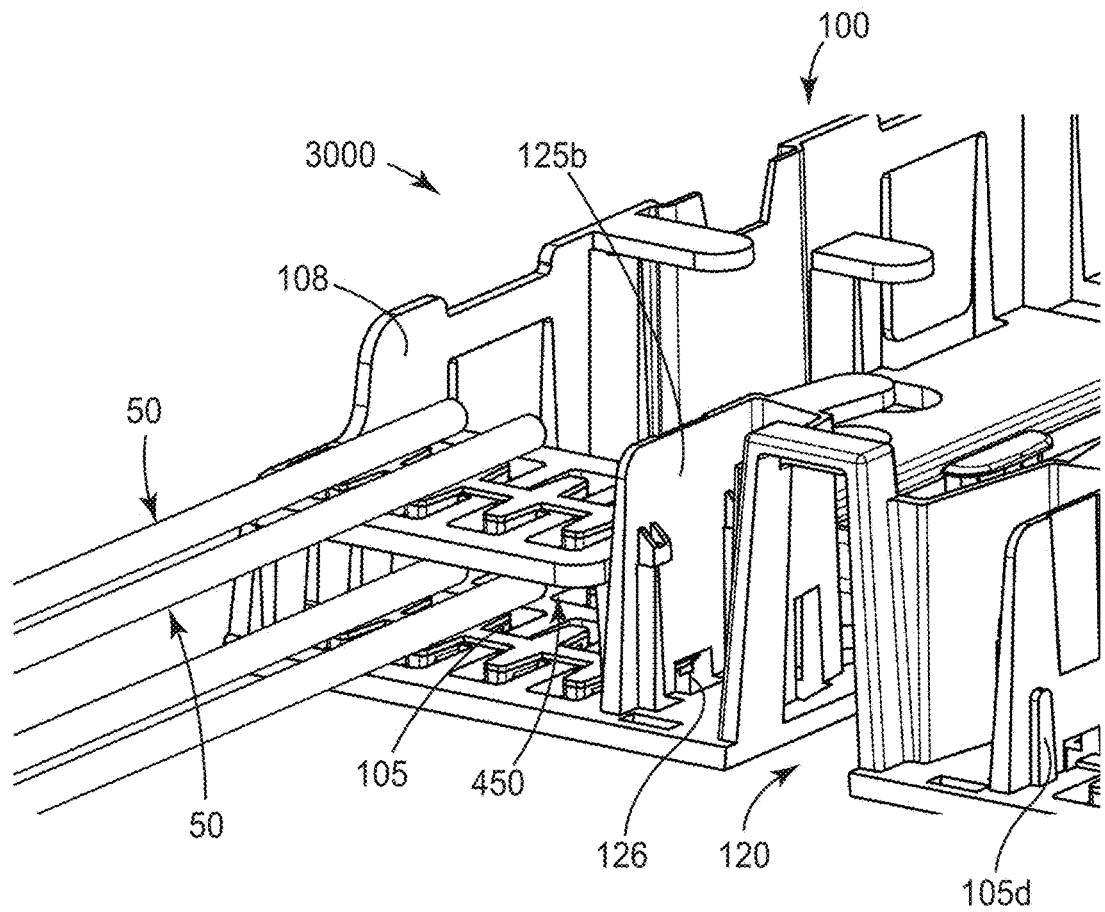

A second embodiment of snap-in cable entry components comprises a cable tie down platform 450 disposed in cable entrance 105 to handle a larger number of optical fibers, buffer tube, cable sub groups or ribbon fibers entering the splice tray 3000. Detail views of cable tie down platform 450 are provided in FIGS. 9A-9B. Cable tie down platform 450 has a flat top plate 452 having a plurality of tie down points 452a to strain relieve cables or buffer tubes 50 in a second layer entering and exiting the exemplary splice tray as shown in FIG. 9B. The entering and exiting cables or buffer tubes can be secured to the tie down points by conventional cable ties (not shown). Cable tie down platform has four legs 453 extending from the flat top plate on a first side 450a and a second side 450b and near the corners of the top plate. A latch arm 455 extends from the flat top plate on each side between legs 453. The latch arm has an outward facing barb 456 that is configured to lock into connection openings or slots 105b in side walls 108 of splice tray 100 and 126 in side partition 125b of receiving portion 120. In an exemplary aspect, cable entrance 105 can include vertical guides 105c disposed on the inside surface of sidewall 108 and 105d formed on partition 125b. The vertical guides fit into grooves 454 formed in the legs 453 of the cable tiedown platform to align and stabilize the cable tiedown platform in the cable entrance.

Figure 10A:
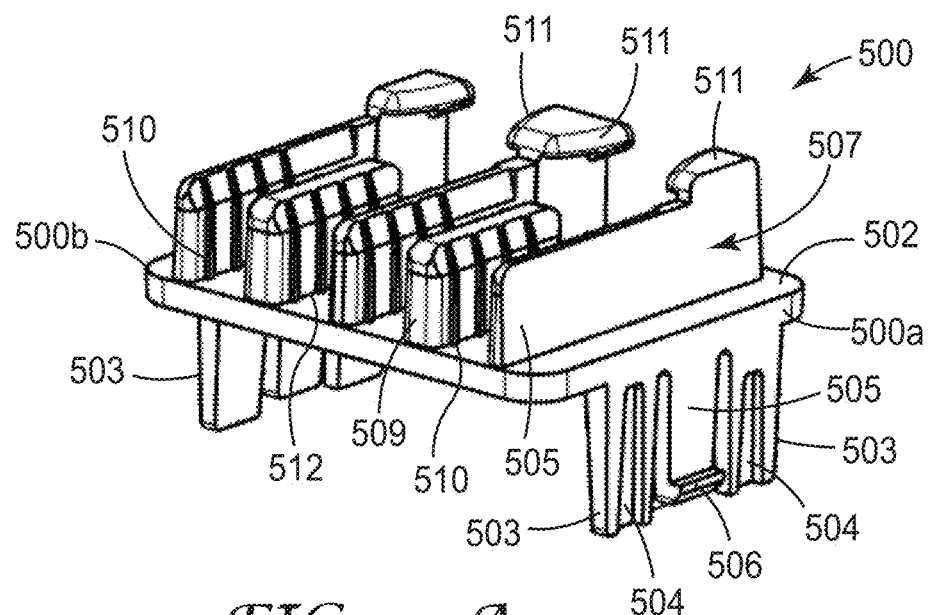
FIGS. 10A and 10B are two views of a second cable entry component used in FIG. 7.
Figure 10B:
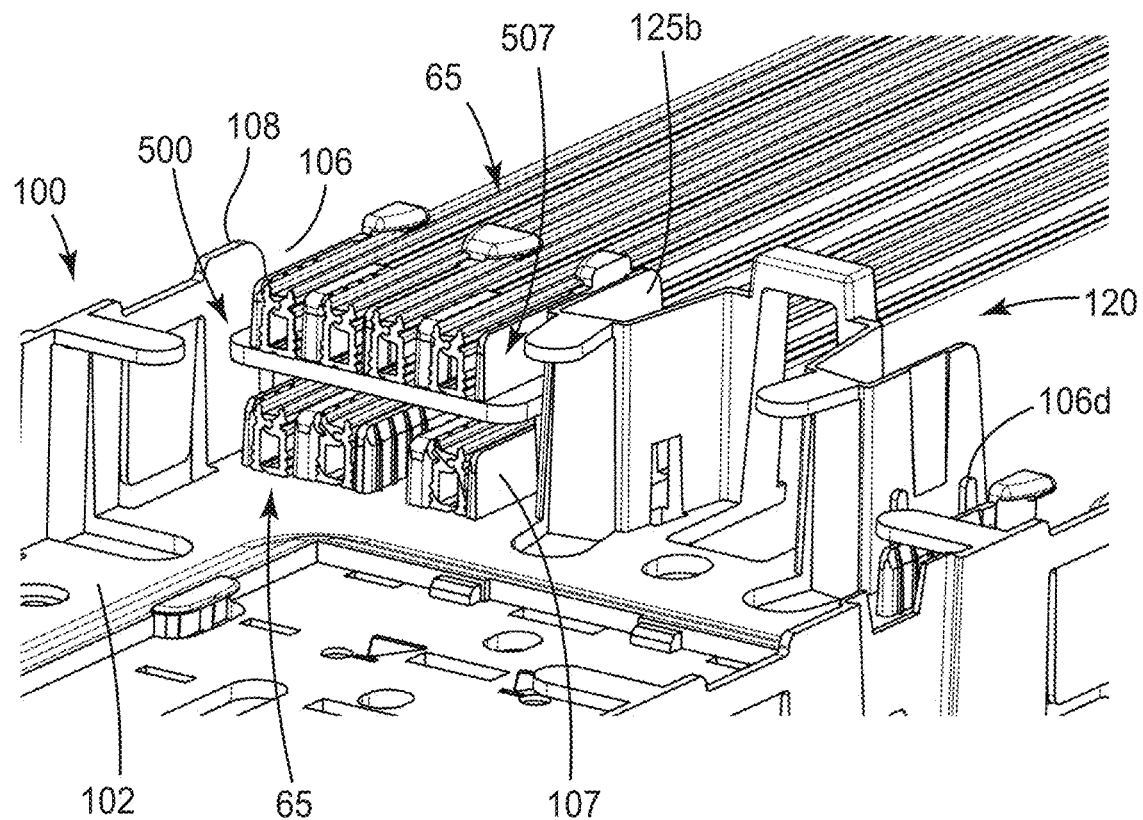

A third embodiment of snap-in cable entry components comprises a cable gripping platform 500. Detail views of cable gripping platform 500 are provided in FIGS. 10A-10B. Cable gripping platform 500 has a flat top plate 502 having a plurality of a plurality of gripping structures 507 formed on top of the top plate to strain relieve cables, zip tubes, or buffer tubes in a second layer entering and exiting the exemplary splice tray as shown in FIG. 10B. In particular, FIG. 10B shows a plurality of zip tubes 65 arranged in two layers in cable entrance 106 of splice tray 100. The first layer is disposed in gripping structures 107 on the base 102 of the tray, and the second layer is disposed in gripping structures 507 disposed in the top plate of the cable gripping platform.

Gripping structures 507 are substantially similar to gripping structures 107 described previously with respect to FIG. 2A. Each gripping structure 507 comprises a pair of parallel wall sections 508, 509 and a plurality of teeth or barbs 510 (shown in FIGS. 2A and 11) on the facing surfaces of the wall sections that will grip onto the surface of the cable, zip tube or buffer tube passing through the gripping devices. In an exemplary embodiment shown in FIG. 10A, the pair of parallel wall sections comprise a long wall section 508 and a short wall section 509. The long wall sections have a hold-down feature 511 formed at the top of an end of each long wall section that extend at least part way over a cable channel through the gripping device. The center long wall section has two hold-down features formed at the top of an end thereof extending at least part way over the cable channels on either side of the center long wall section. The hold-down features are configured to retain the cables, zip tubes, or buffer tubes in the gripping structure.

Cable gripping platform 500 has four legs 503 extending from flat top plate 502 on a first side 500a and a second side 500b and near the corners of the top plate. A latch arm 505 extends from the flat top plate on each side between legs 503. The latch arm has an outward facing barb 506 that is configured to lock into connection openings or slots 106b in side walls 108 of splice tray 100 and (not shown) in side partition 125b of receiving portion 120. In an exemplary aspect, cable entrance 106 can include vertical guides 106c disposed on the inside surface of sidewall 108 and 106d formed on partition 125b shown in FIG. 2A. The vertical guides fit into grooves 504 formed in the legs 503 of the cable gripping platform to align and stabilize the cable gripping platform in the cable entrance.

Figure 11:
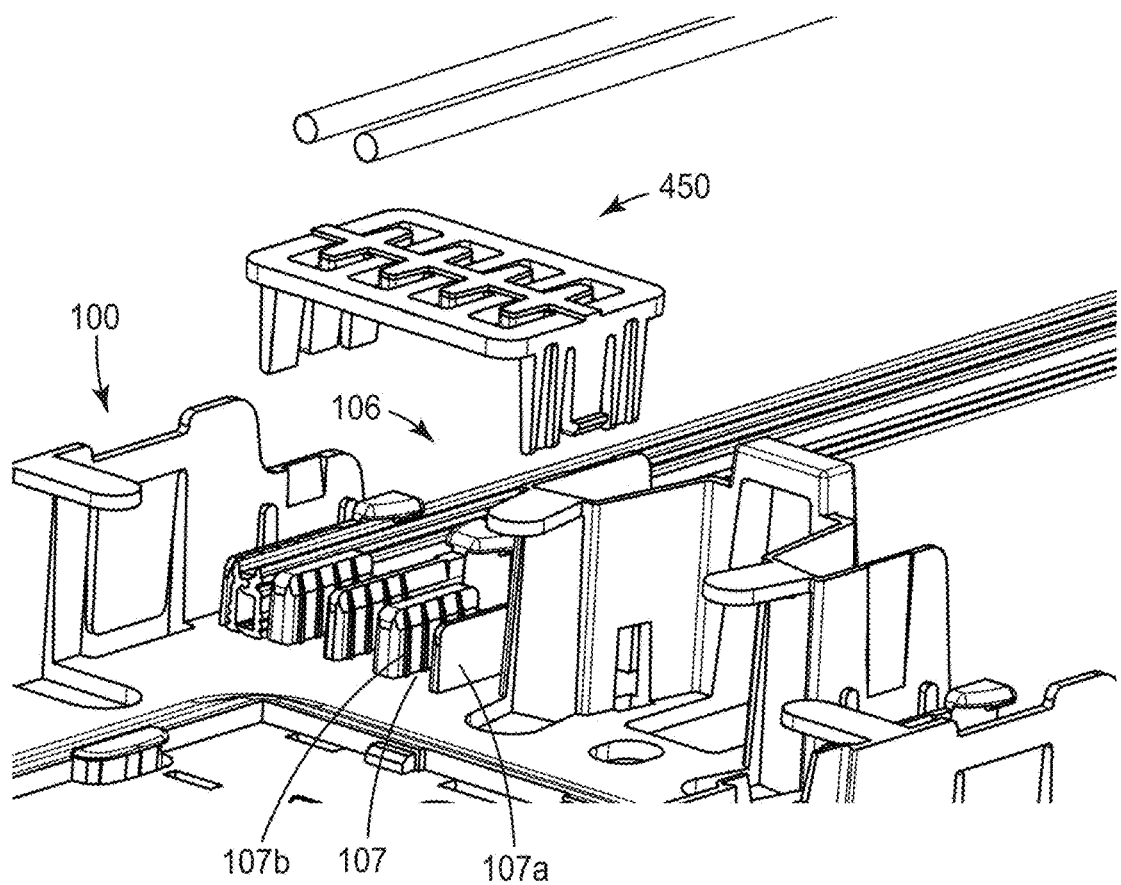
FIG. 11 shows the use of the first cable entry component of FIG. 9A used in a hybrid cable arrangement.

FIG. 11 shows how the use of the snap-in cable entry components, such as a cable tie down platform 450 can be used to create a hybrid cable entry. By providing a common base structure to the snap-in cable entry components and connection features in the cable entrances increases the flexibility of the cable entrances. For example, placing cable tie down platform 450 over the gripping structures 107 in cable entrance 106 different types of optical media can utilize the same cable entrance. Specifically, FIG. 11 shows that a plurality of zip tube can be disposed in a first layer in gripping structures 107 and a plurality of cables or buffer tubes can be secured to the top of the cable tie down platform in a second layer improving the flexibility of cable entrances of splice try 100.

Figure 13:
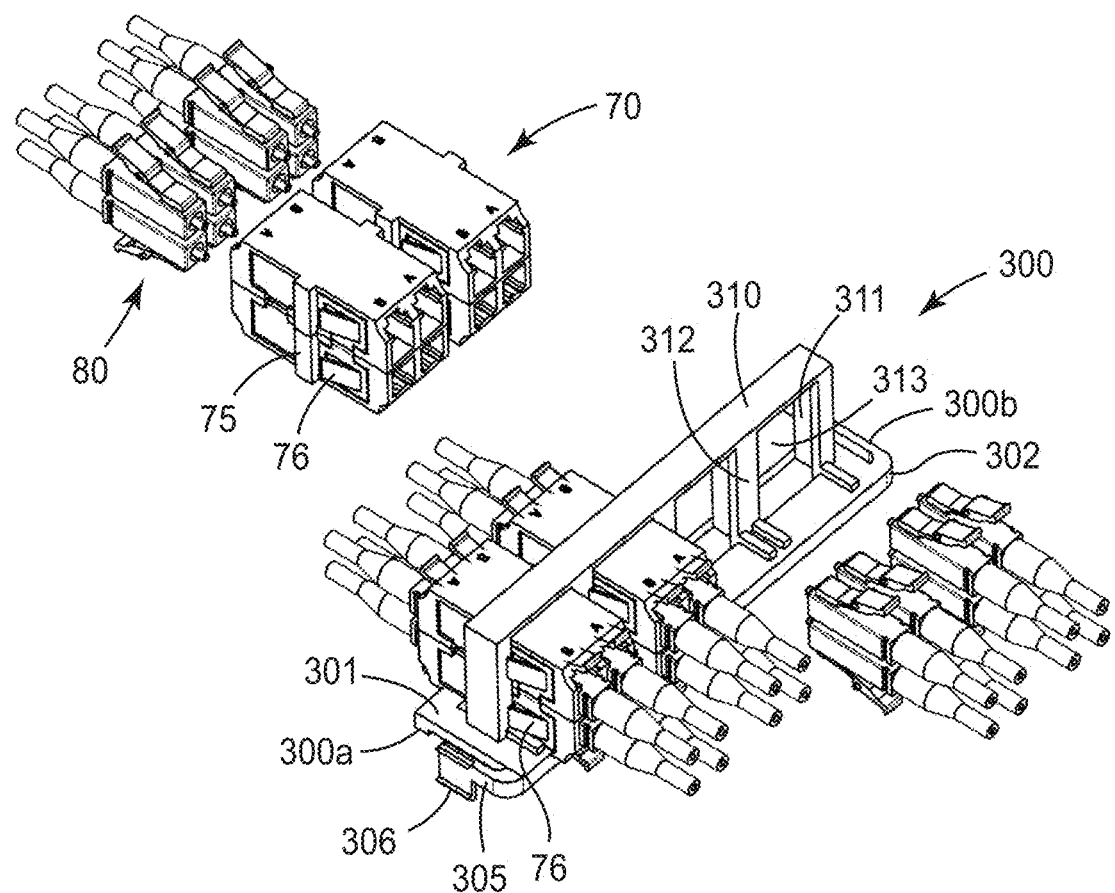
FIG. 13 is an isometric view of a modular fiber optic connector connection component used in FIG. 7.

FIG. 13 is an isometric view of a modular fiber optic connector connection device 300. The fiber optic connector connection device comprises a flat base plate 302 having a first side 300a and a second side and adapter bulkhead 310a extends from the top surface 301 of flat plate 302 between the first and second sides of the base plate.

Adapter bulkhead 310 comprises a generally rectangular open frame 311 having an adapter mounting plate 312 integrally formed thereon and covering a portion of one of the vertical faces of the open frame. The adapter mounting plate has a plurality of openings 313 to accept and hold one or more connector adapters 70. The connector adapters can be selected from simplex connector adapters or duplex connector as described previously. In the exemplary embodiments shown in FIGS. 7, 13 and 14, the modular fiber optic connector connection device 30 holds two connector adapters in each opening 313 by positioning the adapter mounting plate 312 between the flange 57 and the spring clips 76 of the connector adapters. The number of connector adapters housed per opening as well as the number of openings can be altered to change the optical fiber connector connection density held within the splice tray.

Referring to FIGS. 7 and 13, modular fiber optic connector connection device 300 is designed to be housed within the interconnection area 130 of splice tray 100. The base plate of the fiber optic connector connection device further comprises latch arms 305 extending from the from the first and second sides of the baseplate. Each of the latch arms has an outward facing barb 306 that is configured to lock into slots (not shown) formed in the interconnection area of the base plate.

FIG. 14 is a fourth exemplary configuration of the modular, reconfigurable splice tray system in the form of a compact splice tray 4000. Interconnection connection tray 4000 comprises a compact splice tray 100'. The compact splice tray 100' comprises the same structural features as splice tray 100 described previously. The main difference between the splice tray 100 and the compact splice tray 100' shown in FIG. 14 is that the characteristic length, l, of the compact splice tray is smaller than the length, L, of splice tray 100 shown in FIG. 2A. Otherwise the splice trays are analogous allowing the use of any of the modular components described herein to be used with the splice tray 100. In the present embodiment, the compact splice tray comprises one optical component holder that is configured to hold six ribbon fiber splices 90 and an optical connector adapter holder 300 that is configured to connect sixteen optical fiber connector pairs.

FIG. 15 is a fifth exemplary configuration of the modular, reconfigurable splice tray system in the form of a first pivoting splice tray 5000. The first pivoting interconnection connection tray 5000 comprises a splice tray 100 having a plurality of optical component holders 350 disposed in interconnection area 130 of the splice tray, a first snap-on hinge component 600 attached to first receiving portion 120a disposed at a first end 103a of the splice tray and a latch component 550 attached to a second receiving portion 120b disposed at a second end 103b of the splice tray. Unless otherwise mentioned splice tray 100 described with respect to FIG. 2A and as such will not be further described here.

The first snap-on hinge component 600 enables splice trays 100a-100c to be pivotally mounted to a tray mount 800 that can be disposed in an enclosure (not shown) as shown in FIG. 19C. In this way tray 100a can be pivoted to an upright position so that the components inside splice tray 100b can be accessed.

Figure 16A:
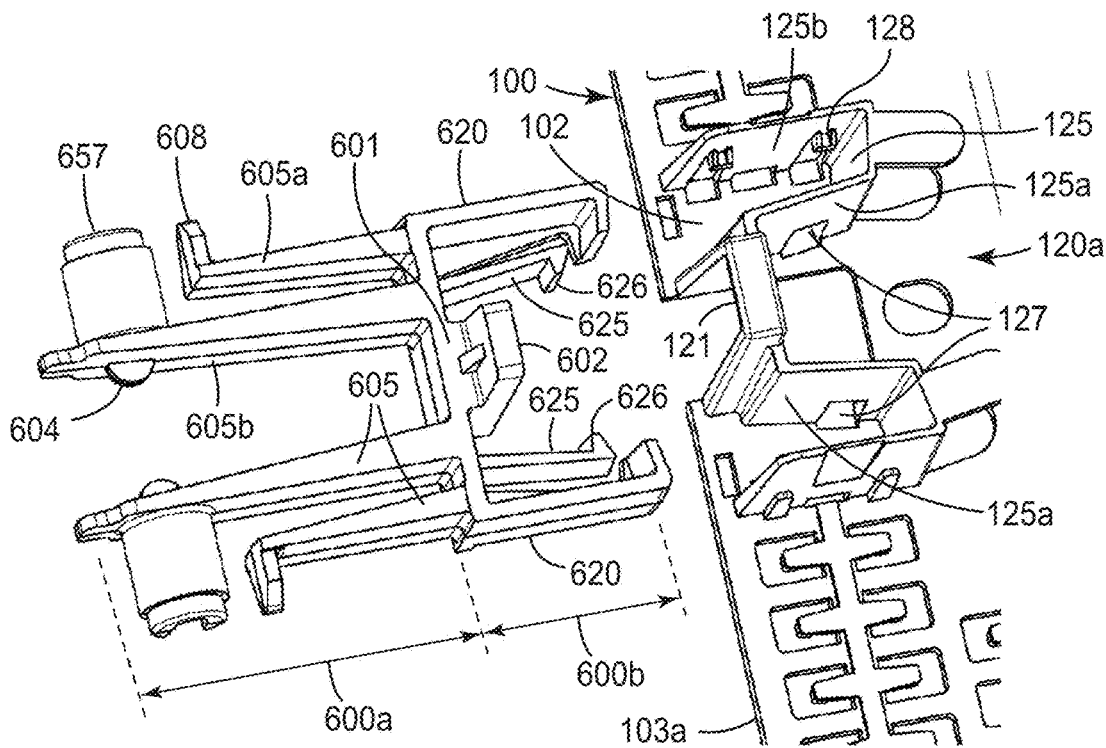
FIGS. 16A-16C are three views of a first tray connection feature used in FIG. 15.
Figure 16B:
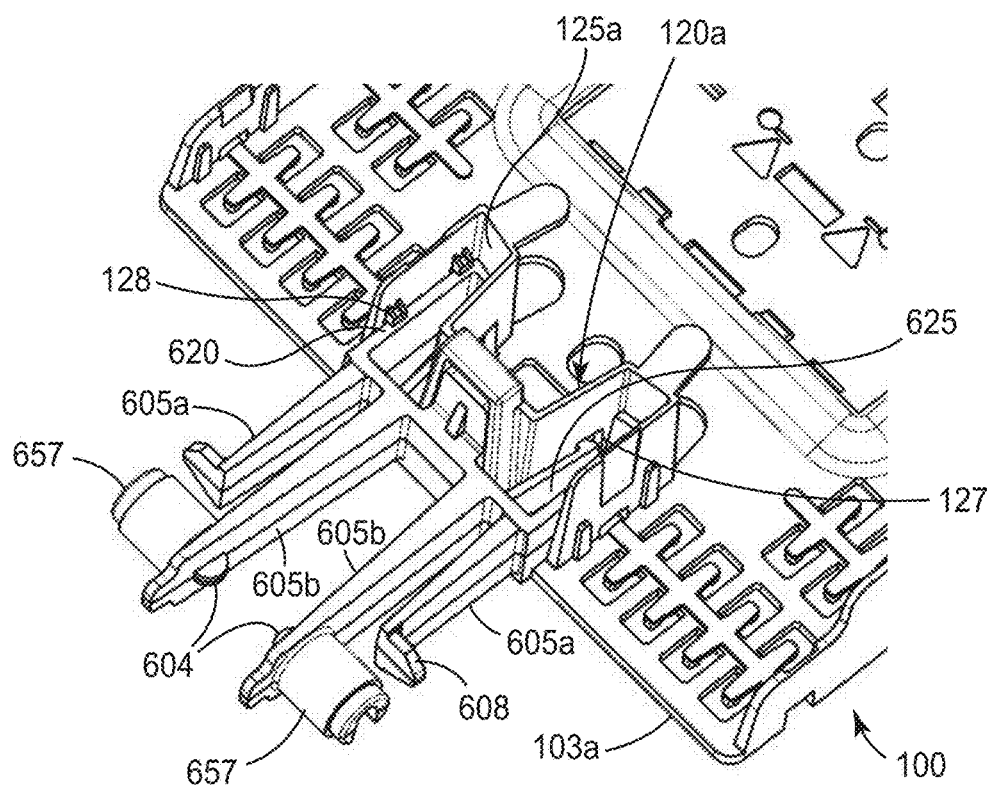
Figure 16C:
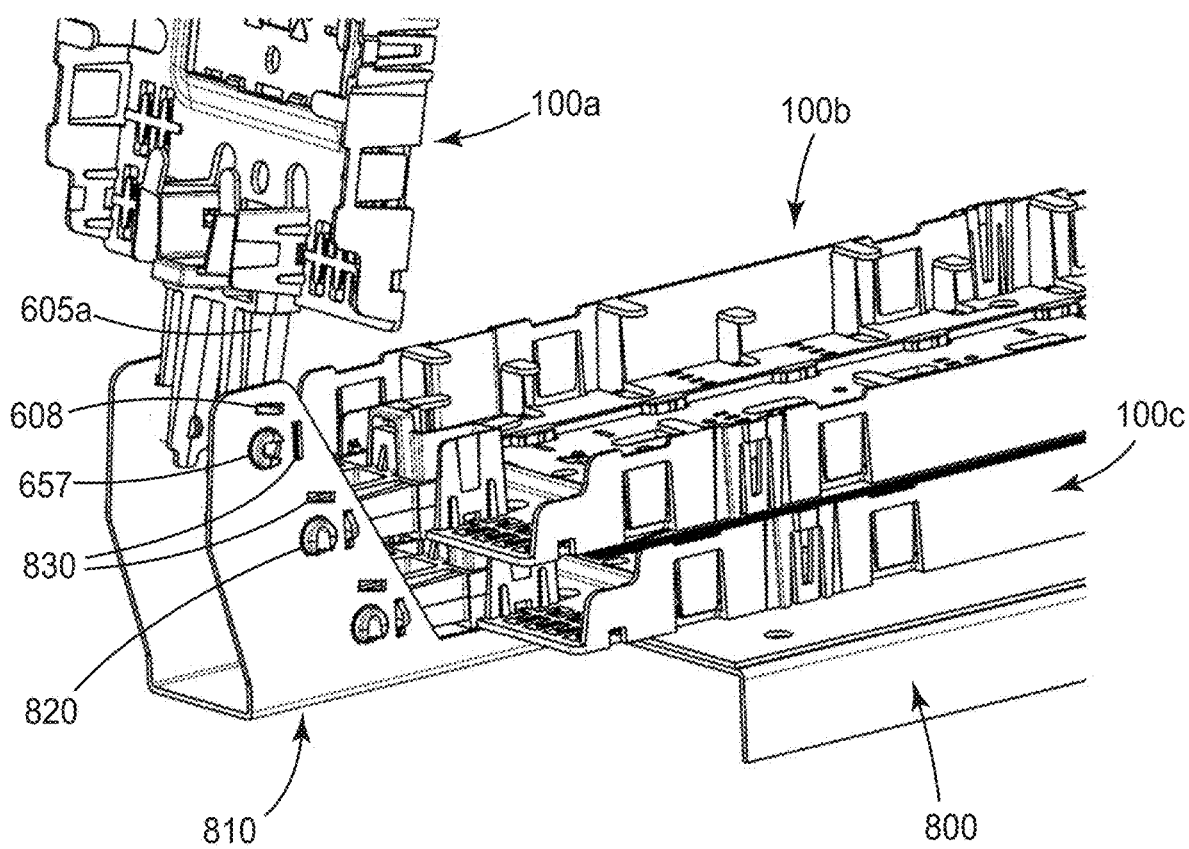

Referring to FIGS. 16A-16C, first hinge component 600 comprises a pivot portion 600a and an anchor portion 600b disposed on opposite sides of a central support member 601. The pivot comprises plurality of legs 605 extending the central support member and each leg includes a first leg portion 605a and a second leg portion 605b. The first leg portion can be slightly shorter than the second leg portion. The first leg portion can have a pivot control projection 608 formed on the end thereof that is configured to engage with openings 830 formed in the tray mount to hold the splice tray in one or more predetermined positions. In the exemplary embodiment shown in FIG. 19C, slots 830 are configured to hold the splice tray in either an open or stacked condition. Note that splice tray 100a is shown in an open condition in FIG. 16C, while splice trays 100b, 100c are disposed in a stacked condition.

The second leg portion can have a pivot projection 607 formed near its end and extending outward from the centerline of the hinge between leg portions 605b. In use, the pivot projection 607 of splice tray 100 is configured to engage with a pivot recess 820 in the tray mount 810 such that the splice tray can move between an open and a stacked condition. of second splice tray 100a disposed beneath it in the tray stack. The second leg portions may also include a flex control protrusion 604 near the free end of each leg portion. The flex control protrusion 604 prevents over bending of the second leg portions when being attached to or detached from the tray mount.

The anchor portion 600b of the first snap-on hinge component 600 comprises a pair of parallel stabilizing struts 620 and a pair of locking arms 625. The stabilizing struts and the locking arms can be inserted into connection bays 125 of receiving portion 120a between partition walls 125a, 125b. When inserted, stabilizing strut 620 is disposed against partition 125b and the base 102 of splice tray 100 and the locking arm is disposed against partition 125a. Brace 128 ensures that the stabilizing strut in the proper position. A hooked end 626 on the end of the locking arm engages with slot 127 in partition 125a to lock the first snap-on hinge component 600 to splice tray 100. The anchor portion can further include a support tab 602 that fits into frame portion 121 to further stabilize the connection of the first snap-on hinge component to splice tray 100.

Figure 17A:
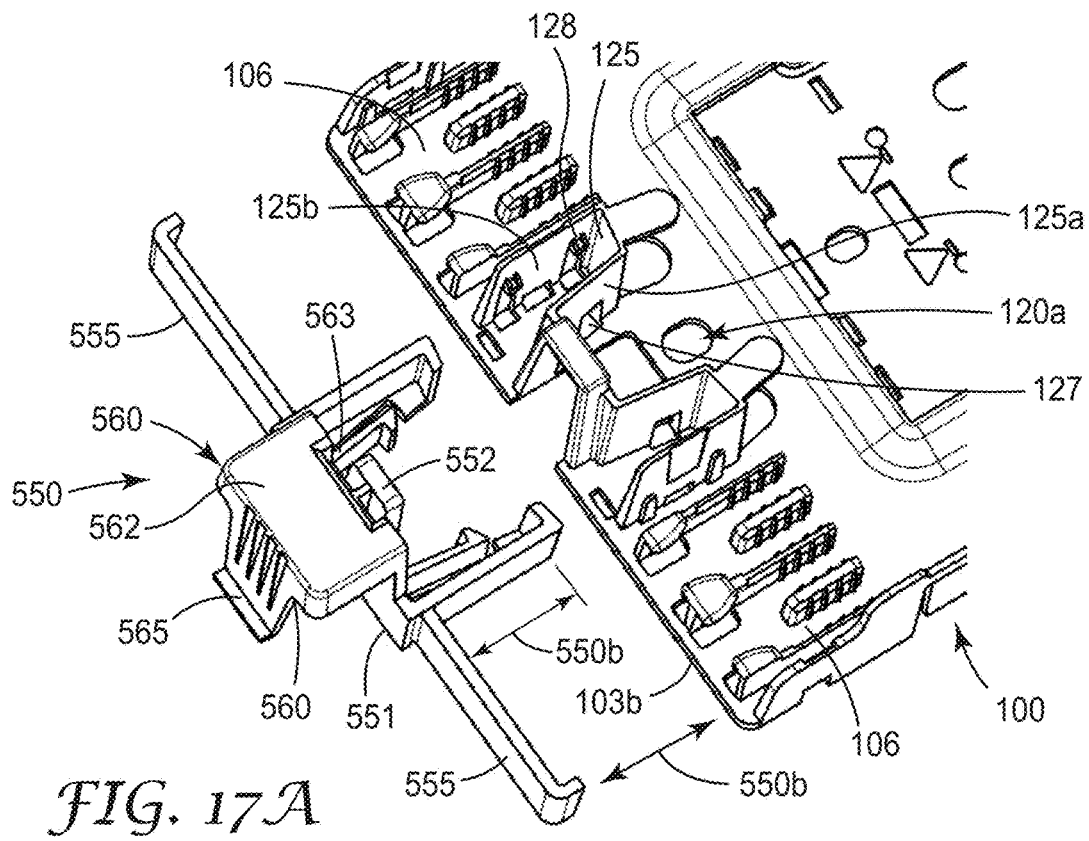
FIGS. 17A and 17B are two views of a second tray connection feature used in FIG. 15.
Figure 17B:
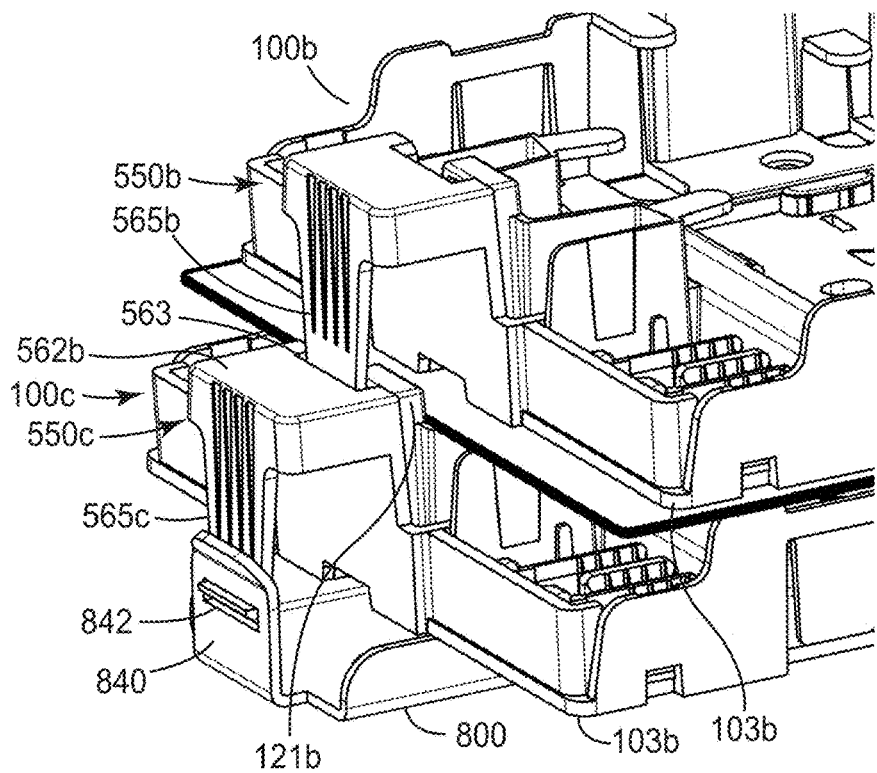

FIGS. 15, 17A-17B, show a latch component 550 that can be attached to a receiving portion disposed at an end of splice tray 100. Latch component 550 comprises an anchor portion 550b, a wall portion 565 and a latch portion 560.

The anchor portion 550b of the latch component 550 comprises a pair of parallel stabilizing struts 570 and a pair of locking arms 575. The stabilizing struts and the locking arms can be inserted into connection bays 125 of receiving portion 120b between partition walls 125a, 125b. When inserted, stabilizing strut 570 is disposed against partition 125b and the base 102 of splice tray 100 and the locking arm is disposed against partition 125a. Brace 128 ensures that the stabilizing strut in the proper position. A hooked end 576 on the end of the locking arm engages with slot 127 in partition 125a to lock the latch component 550 to splice tray 100. The anchor portion can further include a support tab 552 that fits into frame portion 121 to further stabilize the connection of the latch component to splice tray 100.

Wall portion 555 extends laterally from anchor portion 550b and is configured to close an end of the splice tray (i.e. second end 103b in FIGS. 15 and 17b).

Latch portion 560 is attached to the anchor portion 550b and comprises a body portion 562 having a recess 563 formed in a top surface thereof and a catch portion 565. The recess forms a slot between the recess 563 and the frame portion 121 of receiving portion when attached to the receiving portion of splice tray 100. For example, catch 565b of latch component 550b of splice tray 100b can engage with the slot formed by recess 563c and frame portion 121c of splice tray 100c to secure the second ends 103b of splice trays 100a and 100b together as shown in FIG. 17B. The catch 565c of latch component 550c is shown as being engaged with a slot 842 in a hasp 840 of tray mount 800.

In an alternative embodiment, the wall portions can be removed from the modular latch component as shown in FIGS. 21A and 21B and be replaced by arched fiber guide portions 700 that can be fitted into the cable entrances 106 of splice tray 100. The arched fiber guide portions can have a hollow three-dimensional shape configured to fit into the cable entrances of splice tray 100. A arched fiber guide portions can have alignment grooves 704 and a pair of latch arm 705 disposed on opposite sides of the fiber guide portion that are configured to secure the fiber guide portion into a cable entrance. For example, latch arm 705 has an outward facing barb that is configured to lock into connection openings or slots 106b in side walls 108 of splice tray 100 and a slot (not shown) in side partition 125b of receiving portion 120. Vertical guides 106c, 106d fit into the grooves in the fiber guide portion to align and stabilize fiber guide platform in the cable entrance 106.

While FIGS. 15-17B show the first snap-on hinge component 600 attached to the first receiving portion at the first end of splice tray 100 and the latch component attached to the second receiving portion at the second end of the splice tray, it should be recognized that this is an arbitrary assignment since the first and second receiving portions have analogous structures and either component may be secured to either end of the splice tray in a similar manner to that described above.

Figure 18:
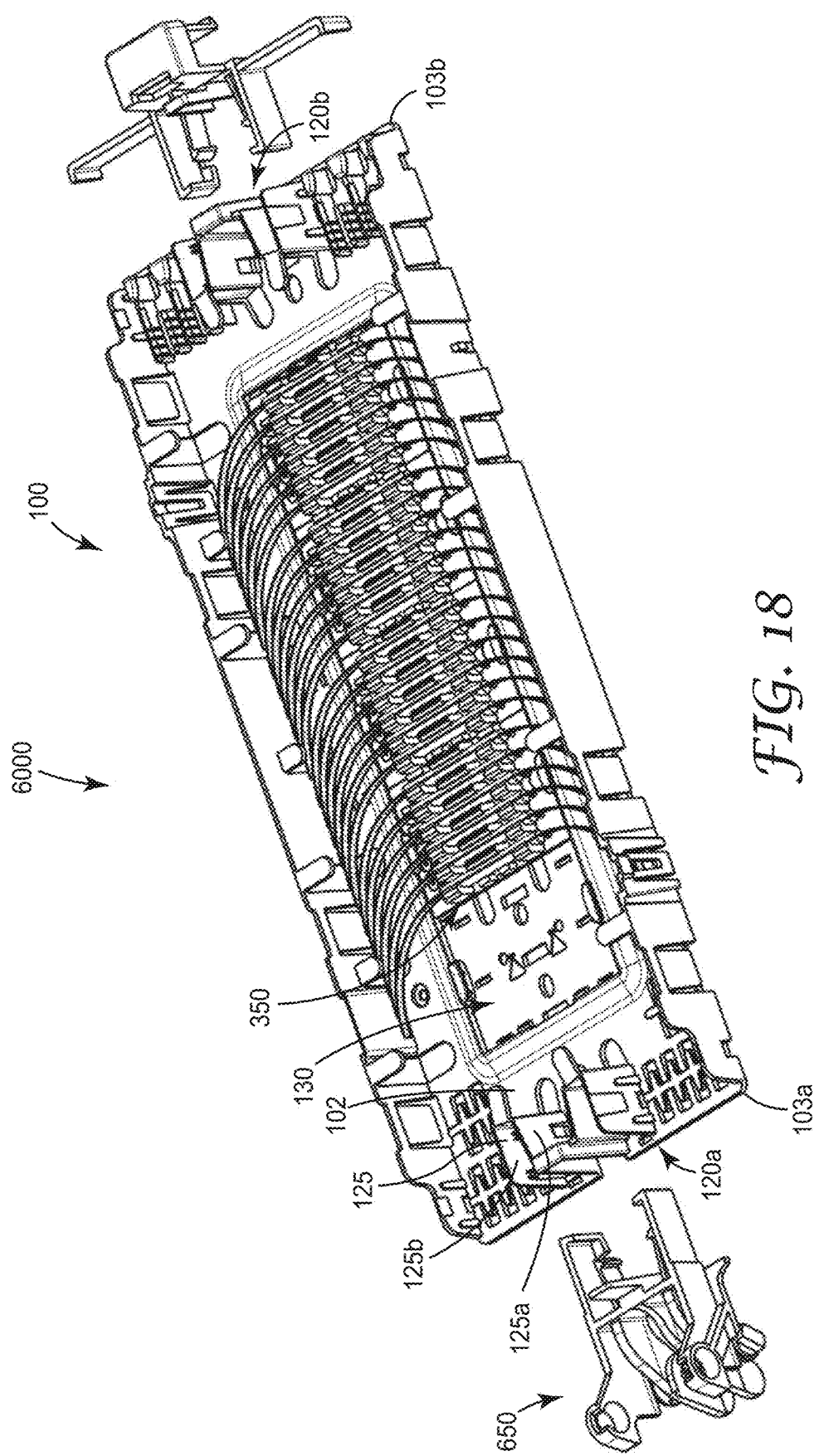
FIG. 18 is a sixth exemplary configuration of the modular, reconfigurable splice tray system of the present invention.

FIG. 18 is a partially exploded view of a sixth exemplary configuration of the modular, reconfigurable splice tray system in the form of a second pivoting splice tray 6000. The second pivoting interconnection connection tray 6000 comprises a splice tray 100 having a plurality of optical component holders 350 disposed in interconnection area 130 of the splice tray, a second snap-on hinge component 650 attached to first receiving portion 120a disposed at a first end 103a of the splice tray and a latch component 550 attached to a second receiving portion 120b disposed at a second end 103b of the splice tray. Unless otherwise mentioned splice tray 100 described with respect to FIG. 2A and as such will not be further described here.

Figure 19A:
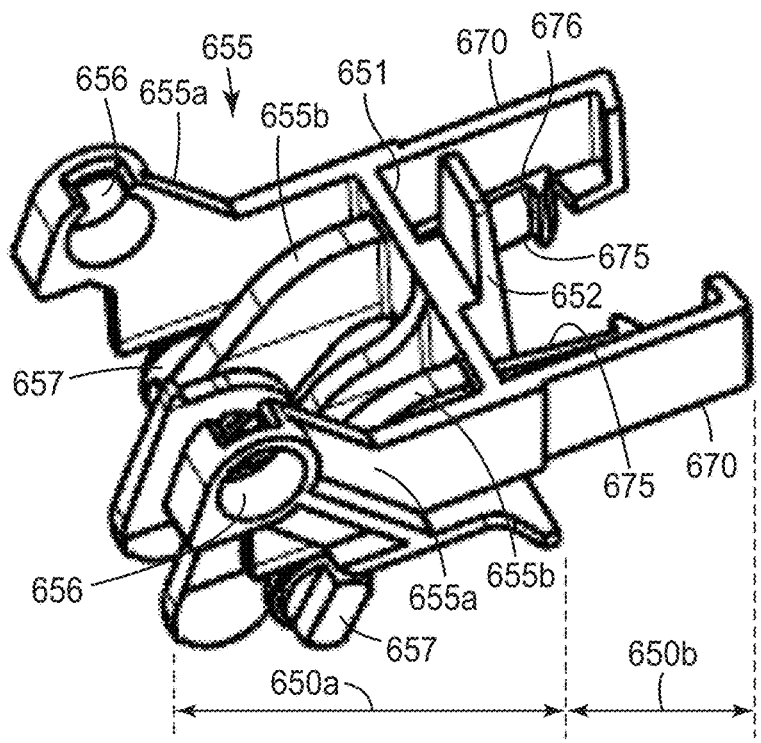
FIGS. 19A and 19B are two views of a third tray connection feature used in FIG. 18.
Figure 19B:
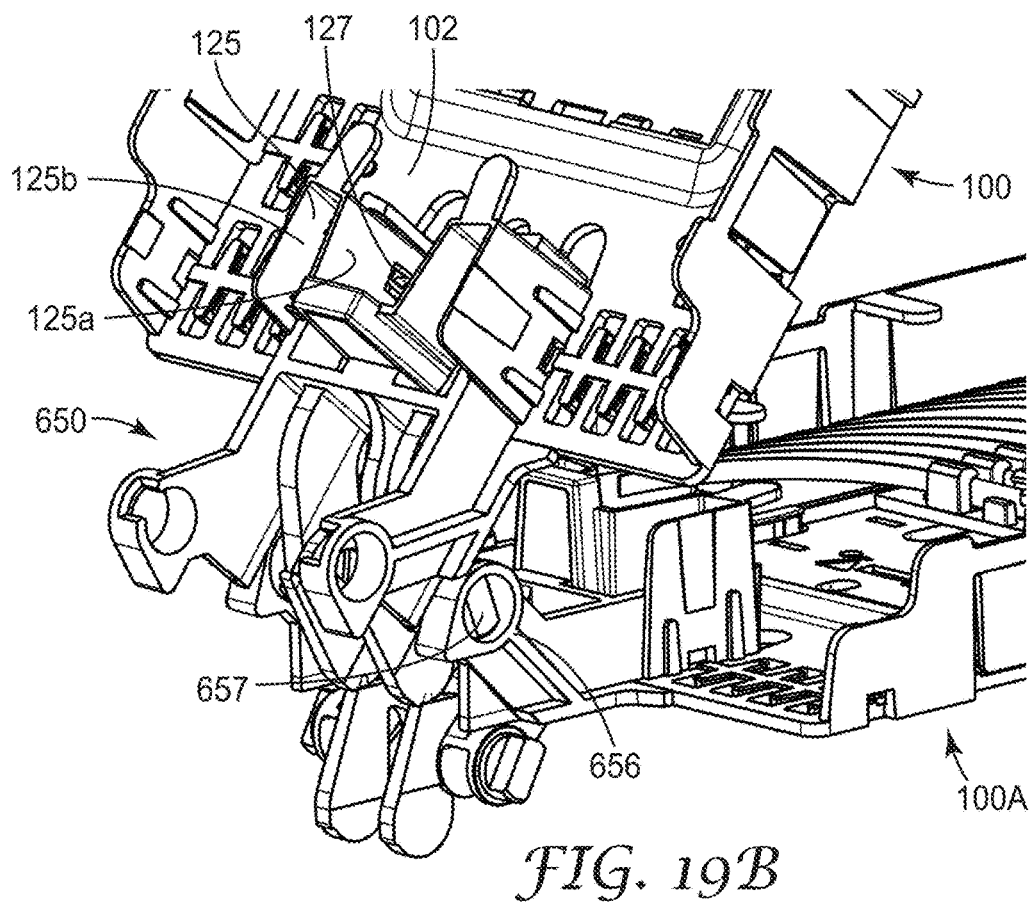

The second snap-on hinge component 650 enables a splice trays 100 to be pivotally mounted to a second splice tray 100 beneath it by a hinging mechanism disposed at the first end 103a of the base 102 as shown in FIG. 19B.

Referring to FIGS. 19A and 19B, second hinge component 650 comprises a pivot portion 650a and an anchor portion 650b disposed on opposite sides of a central support member 651. The pivot comprises plurality of legs 655 extending the central support member and each leg includes a first leg portion 655a and a second leg portion 655b. The first leg portion can be slightly longer than the second leg portion allowing the trays to be offset from one another in a stepped arrangement when stacked, thus permitting free access to the second splice tray 100a when splice tray 100 is rotated to an open position. The first leg portion can have a pivot recess 656 formed on the end thereof and the second leg portion can have a pivot projection 657 formed near its end. In use the pivot projection 657 of splice tray 100 is configured to engage with a pivot recess 656A of second splice tray 100a disposed beneath it in the tray stack.

The anchor portion 650b of the second snap-on hinge component 650 comprises a pair of parallel stabilizing struts 670 and a pair of locking arms 675. The stabilizing struts and the locking arms can be inserted into connection bays 125 of receiving portion 120a between partition walls 125a, 125b. When inserted, stabilizing strut 670 is disposed against partition 125b and the base 102 of splice tray 100 and the locking arm is disposed against partition 125a. A brace 128 (FIG. 2B) ensures that the stabilizing strut in the proper position. A hooked end 676 on the end of the locking arm engages with slot 127 in partition 125a to lock the second snap-on hinge component 650 to splice tray 100. The anchor portion can further include a support tab 652 that fits into frame portion 121 to further stabilize the connection of the second snap-on hinge component to splice tray 100.

Figure 20A:
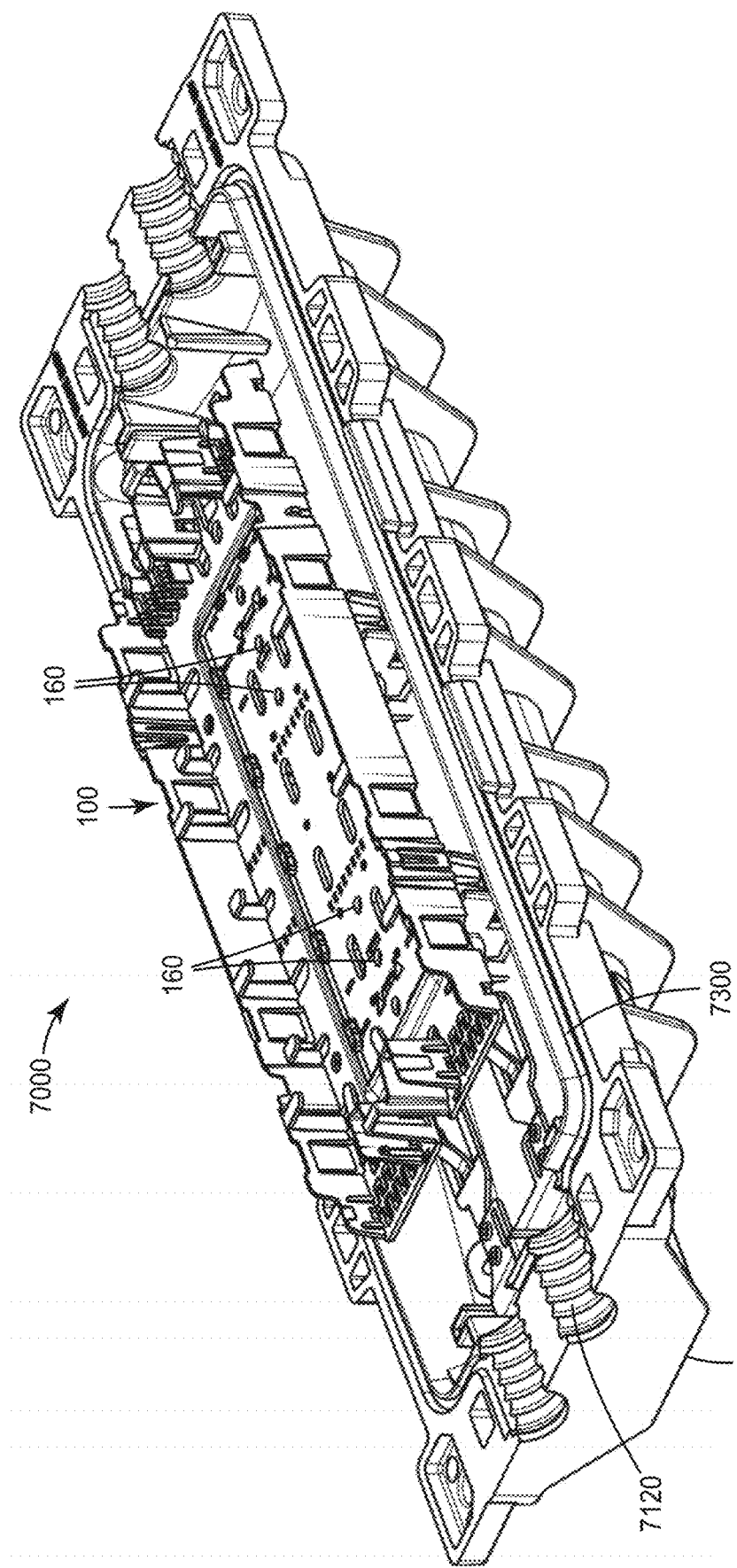
FIGS. 20A-20C illustrate one way that a splice tray of the modular, reconfigurable splice tray system can be mounted in an enclosure.
Figure 20B:
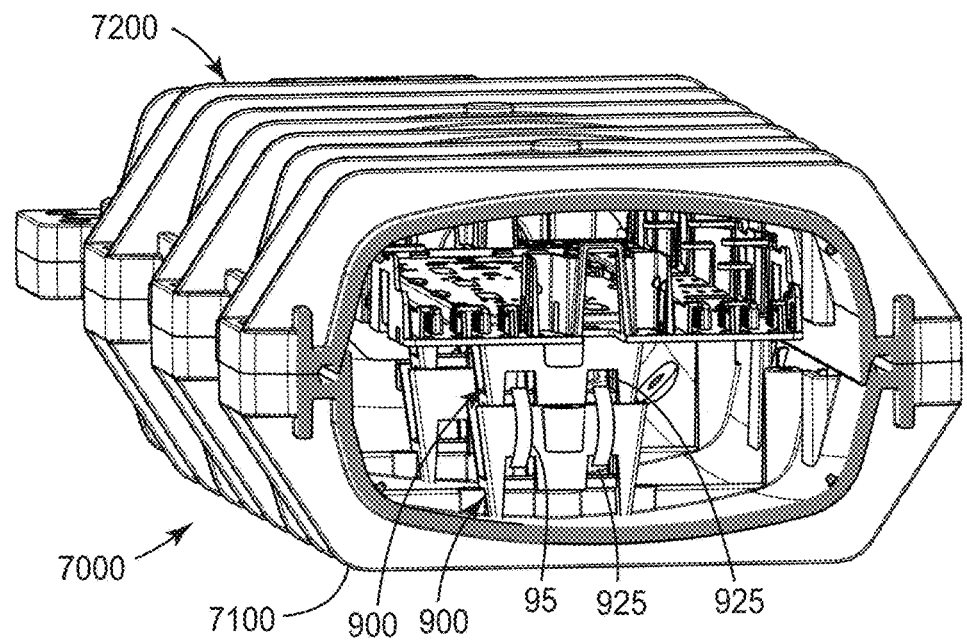
Figure 20C:
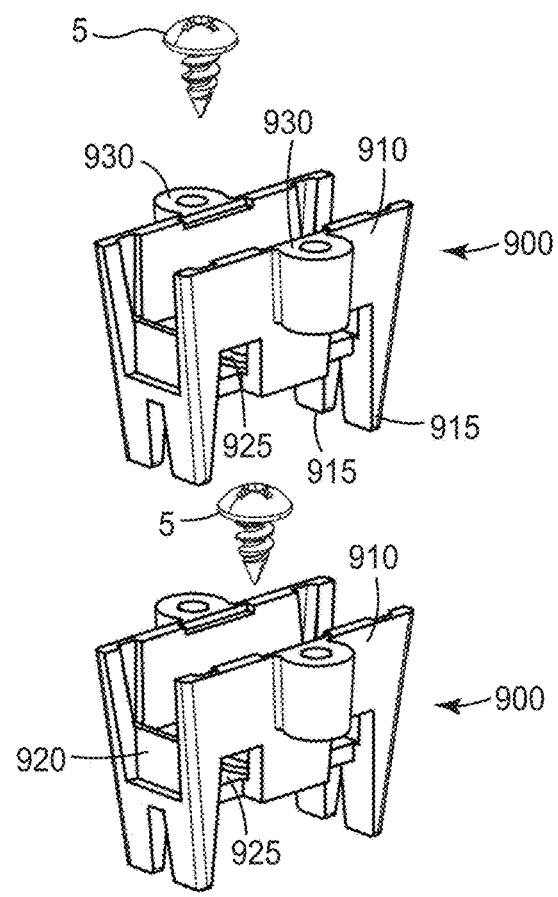

FIGS. 20A-20C illustrate another way of securing the exemplary interconnection systems of the present invention into an enclosure 7000. For the sake of simplicity, the interconnection system is represented by splice tray 100 in these figures. FIG. 20A shows the base 7100 of enclosure 7000 having the splice tray of the exemplary interconnection system disposed therein without the need of a splice tray platform 1050 shown in FIG. 4 or the tray mount 800 shown in FIG. 16C. Instead splice tray 100 is secured in the base of the enclosure by modular, stackable tray supports 900. FIG. 20B is a sectional view of enclosure 7000. Enclosure 7000 comprises a base 7100 and a cover 7200 that can be secured to the base to provide a protected interior space. The enclosure will include some number of cable ports to allow cables to enter and exit the protected space. In enclosure 7000, the cable ports are formed when port portions, such as port portions 7120 shown in FIG. 20A, in the base and the cover are brought together. The protected space within the enclosure is used to store slack fiber/cable and to interconnect fibers from a plurality of cables (not shown). One advantage of the high-density interconnection structures of the present invention is that a plurality of splice trays can be reduces to a single splice tray providing additional room to store slack.

The modular, stackable tray supports 900 shown in FIGS. 20B and 20C can provide additional flexibility on how the splice trays are stored within the enclosure. If additional slack storage is needed the tray supports can be stacked to provide more space below the splice tray. If less slack is required, but more trays, a single tray support can be used to maximize the number of splice trays that can be house in the enclosure. Additionally, using the modular tray supports can allow positioning of the splice trays to minimize interference with the cable ports.

Tray supports 900 have a body 910 and a plurality of tapered legs 915 that engage with recessed portion 920 in the body of another of the tray supports. Openings can be formed through the body to locking a stack of tray supports together with a cable tie 95 (FIG. 20B). Splice tray 100 can be secured to the top tray support in a stack of tray supports by one or more mechanical fasteners, e.g. screws 5, inserted through holes 160 in the base 103 of the splice tray and pass into threaded receptacle 930 integrally formed with the body of the tray supports The modular, reconfigurable splice tray system described herein is a highly configurable splice tray system that can allow the craftsman greater flexibility to design an splice tray or system that can meet diverse network design requirements with a common set of modular accessories. The exemplary splice tray of the exemplary modular, reconfigurable splice tray system can be combined with a wide range of modular components to change not only the configuration of the splice tray, but the application space where the splice tray can be used. The same base splice tray can be used in both inline applications as well as in butt-style configurations.

The modular, reconfigurable splice tray system can be used for splicing ribbon and/or discrete fiber using snap-in stackable cable entry devices. The style of the cable entry region of a splice tray can be changed by utilizing snap-in cable entry components. In some embodiments the snap-in cable entry components allow multi-level fiber entry attach points. While in other embodiments, the snap-in cable entry components can be used to mount fiber optic connector adaptors enabling optical fiber connector connections in the cable entry region of the splice tray.

Additionally, the exemplary spice tray trays described herein can be attached together in a side-by-side configuration to create a larger tray having multiple compartments. The wall between adjacent compartments include removable partitions for fibers to pass between adjacent compartments. Tray expansion features are self-mating and require no additional parts.

The modular, reconfigurable splice tray system includes additional snap-in modular components to increase the trays splice density using a removable splice insert riser. In another aspect, the removable splice insert riser can removed from the splice tray during the splicing and reinstalled in the tray afterwards. In some applications, the space under the insert riser can be used to manage and store the ribbon fiber.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The invention claimed is:

1. A modular, reconfigurable splice tray system, comprising:
    a splice tray having a base, a pair of side walls extending longitudinally from a first end to a second end of the base, and a plurality of cable entrances formed at the first end and the second end of the base, and
    at least one modular component comprising a plurality of snap-in cable entry components to allow multi-level fiber entry attach points,
    wherein each side wall includes tray connection features that are configured to connect two splice trays together in a side-by-side configuration, and wherein the number of snap-in cable entry used in the system is up to the number of cable entrances in the splice tray; and
    wherein the at least one of the plurality of snap-in cable entry components comprises a top plate having a first side and a second side, a plurality of legs extending from the first side and the second side of the top plate, and a latch arm disposed between the plurality of legs on the first side and the second side of the top plate.

2. The system of claim 1, wherein the tray connection features comprise at least one of a latching protrusion, a dovetail depression, a latch, and a dovetail locking element.

3. The system of claim 1, wherein the at least one modular component is an optical connector connection platform having an adapter bulkhead that is configured to hold a plurality of connector adapters.

4. The system of claim 1, wherein the at least one modular component is a cable tie down platform that has a plurality of tie down points formed in the surface of the top plate to provide strain relief cables or buffer tubes entering and exiting the splice tray.

5. The system of claim 1, wherein the at least one modular component is a cable gripping platform that has a plurality of gripping structures formed on the top plate to strain relieve cables, zip tubes, or buffer tubes in a second layer entering and exiting the splice tray.

6. The system of claim 1, wherein the splice tray further comprises a first interconnection layer disposed on the base, and a second interconnection layer positioned over at least a portion of the first interconnection layer, wherein the second interconnection layer is disposed on a removable optical component riser that can be attached to the base at a plurality of locations.

7. The system of claim 1, further comprising at least one optical component holder disposed in the splice tray.

8. The system of claim 6, further comprising at least one optical component holder disposed on the removable optical component riser.

9. The system of claim 8, wherein the at least one optical component holder is configured to hold a plurality of optical components selected from the group consisting of optical splitters, mass fusion splices, single fusion splices, multifiber mechanical splices and mechanical splices.

10. The system of claim 1, wherein the at least one modular component is a hinge component that attaches to a receiving portion of the splice tray.

11. The system of claim 1, wherein the at least one modular component is a latch component that attaches to a receiving portion of the splice tray.

12. The system of claim 1, wherein the at least one modular component is an optical fiber connector adapter holder that is connected to the base of the splice tray between the first end and the second end of the base.

13. A modular, reconfigurable splice tray system, comprising:
    a splice tray having a base, a pair of side walls extending longitudinally from a first end to a second end of the base, and a plurality of cable entrances formed at the first end and the second end of the base, and
    at least one modular component comprising a plurality of snap-in cable entry components to allow multi-level fiber entry attach points,
    wherein each side wall includes tray connection features that are configured to connect two splice trays together in a side-by-side configuration, and wherein the number of snap-in cable entry used in the system is up to the number of cable entrances in the splice tray, and
    wherein the splice tray further comprises a first interconnection layer disposed on the base, and a second interconnection layer positioned over at least a portion of the first interconnection layer, wherein the second interconnection layer is disposed on a removable optical component riser that can be attached to the base at a plurality of locations.

14. The system of claim 13, wherein the tray connection features comprise at least one of a latching protrusion, a dovetail depression, a latch, and a dovetail locking element.

15. The system of claim 13, further comprising at least one optical component holder disposed in the splice tray.

16. The system of claim 13, further comprising at least one optical component holder disposed on the removable optical component riser.

17. The system of claim 15, wherein the at least one optical component holder is configured to hold a plurality of optical components selected from the group consisting of optical splitters, mass fusion splices, single fusion splices, multifiber mechanical splices and mechanical splices.

18. The system of claim 13, wherein the at least one modular component is a latch component that attaches to a receiving portion of the splice tray.

19. A modular, reconfigurable splice tray system, comprising:
    a splice tray having a base, a pair of side walls extending longitudinally from a first end to a second end of the base, and a plurality of cable entrances formed at the first end and the second end of the base, and at least one modular component comprising a plurality of snap-in cable entry components to allow multi-level fiber entry attach points, wherein each side wall includes tray connection features that are configured to connect two splice trays together in a side-by-side configuration, and wherein the number of snap-in cable entry used in the system is up to the number of cable entrances in the splice tray, and wherein the at least one modular component is a hinge component that attaches to a receiving portion of the splice tray.

* * * * *